(12) United States Patent
McDonnell et al.

(10) Patent No.: US 11,608,871 B2
(45) Date of Patent: Mar. 21, 2023

(54) MULTISTRUCTURAL SHOCK ABSORBING SYSTEM FOR ANATOMICAL CUSHIONING

(71) Applicants: Kevin McDonnell, Miami, FL (US); Alexandra McDonnell, Miami, FL (US)

(72) Inventors: Kevin McDonnell, Miami, FL (US); Alexandra McDonnell, Miami, FL (US)

( * ) Notice: Subject to any disclaimer, the term of this patent is extended or adjusted under 35 U.S.C. 154(b) by 267 days.

(21) Appl. No.: 16/716,331

(22) Filed: Dec. 16, 2019

(65) Prior Publication Data

US 2020/0116225 A1   Apr. 16, 2020

Related U.S. Application Data

(60) Continuation-in-part of application No. 16/221,557, filed on Dec. 16, 2018, now Pat. No. 11,215,257.

(Continued)

(51) Int. Cl.
| | |
|---|---|
| *A43B 13/20* | (2006.01) |
| *F16F 9/10* | (2006.01) |
| *A43B 13/18* | (2006.01) |
| *A43B 13/12* | (2006.01) |
| *A43B 1/00* | (2006.01) |
| *A63B 71/08* | (2006.01) |
| *A43B 17/03* | (2006.01) |
| *A42B 3/12* | (2006.01) |

(Continued)

(52) U.S. Cl.
CPC .............. *F16F 9/106* (2013.01); *A42B 3/121* (2013.01); *A43B 1/0054* (2013.01); *A43B 13/12* (2013.01); *A43B 13/181* (2013.01); *A43B 13/189* (2013.01); *A43B 13/206* (2013.01); *A43B 17/03* (2013.01); *A63B 71/081* (2013.01); *A63B 71/1225* (2013.01); *F16F 13/06* (2013.01); *A63B 2071/1258* (2013.01); *A63B 2209/10* (2013.01)

(58) Field of Classification Search
CPC ..... A43B 13/20; A43B 13/203; A43B 13/206; A43B 13/181; A43B 13/18; A43B 13/183; A43B 3/122
USPC ........................... 36/28, 37, 44, 69; 428/178
See application file for complete search history.

(56) References Cited

U.S. PATENT DOCUMENTS 4,541,136 A * 9/1985 Graebe ................ A47C 27/081
                                                          5/655.3
5,060,328 A * 10/1991 Larson ................. A47C 27/085
                                                          297/DIG. 8

(Continued)

*Primary Examiner* — Timothy K Trieu
(74) *Attorney, Agent, or Firm* — Felix L. Fischer

(57) ABSTRACT

A shock absorbing system for force attenuation, impact modification or reduction, employs an envelope having a chamber containing a first working fluid, the envelope deformable in response to the impulse to attenuate impact force. A plurality of resilient supplemental absorber elements dispersed within the chamber. The plurality of resilient supplemental absorber elements are deformable in response to the force to assist in attenuating impact force and provide additional resilient restoring force to return the envelope to a pre-impact shape. In alternative implementations, a unitary cell for energy dissipation employs an envelope having a chamber containing a first working fluid and an inner element contained within the chamber and having an inner chamber containing a second working fluid.

20 Claims, 24 Drawing Sheets

Related U.S. Application Data which is a division of application No. 14/832,636, filed on Aug. 21, 2015, now Pat. No. 10,167,922, which is a continuation-in-part of application No. 13/283,919, filed on Oct. 28, 2011, now abandoned.

(51) Int. Cl.
*F16F 13/06*    (2006.01)
*A63B 71/12*    (2006.01)

(56)         References Cited

U.S. PATENT DOCUMENTS

| | | | |
|---|---|---|---|
| 5,701,621 A * | 12/1997 | Landi | B29D 99/0089 |
| | | | 428/116 |
| 6,402,879 B1 * | 6/2002 | Tawney | A43B 13/20 |
| | | | 36/35 R |
| 8,178,022 B2 * | 5/2012 | Schindler | A61K 31/713 |
| | | | 264/261 |
| 2002/0053146 A1 | 5/2002 | Swigart | |
| 2006/0086003 A1 | 4/2006 | Tseng | |
| 2009/0151093 A1 * | 6/2009 | Schindler | A61K 31/713 |
| | | | 12/146 B |
| 2012/0260526 A1 * | 10/2012 | Smith | A43B 9/02 |
| | | | 36/83 |
| 2013/0122256 A1 | 5/2013 | Kleiven et al. | |
| 2015/0272270 A1 | 10/2015 | Im | |
| 2016/0178470 A1 | 6/2016 | Ge | |
| 2016/0255900 A1 | 9/2016 | Browd et al. | |
| 2016/0295967 A1 | 10/2016 | Campos, II et al. | |
| 2016/0302507 A1 | 10/2016 | Lewis et al. | |
| 2018/0184745 A1 | 7/2018 | Stone et al. | |
| 2018/0338578 A1 | 11/2018 | Elder et al. | |

* cited by examiner

MULTISTRUCTURAL SHOCK ABSORBING SYSTEM FOR ANATOMICAL CUSHIONING

REFERENCES TO RELATED APPLICATIONS

This application is a continuation in part (CIP) of application Ser. No. 16/221,557 filed on Dec. 16, 2018 which is a division of application Ser. No. 13/283,919 filed on Oct. 28, 2011 entitled MULTISTRUCTURAL SHOCK ABSORBING SYSTEM FOR ANATOMICAL CUSHIONING the disclosures of which are incorporated herein by reference.

BACKGROUND OF THE INVENTION

Field of the Invention

This invention relates generally to the field of shock absorbing devices for reducing anatomical shock including hiking, walking, athletic or running shoes, padding systems such as shin guards or shoulder pads and helmets, or flooring and, more particularly, to a structural support system having at least one compressible element enclosing a first working fluid encased within an envelope that contains a second working fluid and resilient structural elements to provide impulse attenuation from impacts including possible configuration of the envelope as a unitary cell for easy replacement if ruptured.

Description of the Related Art

Athletes engaging in sports of various types continue to expand the limits of their performance. Impact from running or other rapid movement trauma, body or ball contact such as in football or soccer associated sports is increasingly creating various stress or impact related injuries including concussions. Many activities are pursued by individuals in which heel strike or other foot impact including walking, hiking, running or other sports activities may contribute to repetitive stress injury or other long term complications. In sports such as football, blows to the body and head, while padded to some extent, are becoming more forceful and the potential for injury is increasing. Other sports such as soccer or lacrosse or hockey require shin guards or other padding to ameliorate strikes on the body from balls, competitor's kicks or playing implements such as lacrosse sticks or hockey sticks. In addition, potential for significant injury in activities such as motorcycling, bicycling, skiing, and other sports, requires that helmets be used for force and impulse reduction/redistribution. Resilient mechanical elements, pneumatic bladders and other elements have been employed. However, shock absorbing elements used in prior art systems may degrade or rupture reducing their effectiveness.

It is desirable to provide a structure which adequately absorbs and dissipates impact energy that can be tailored to the activity in which the individual or athlete is engaged and provide easy replacement if shock absorbing capability is degraded.

SUMMARY OF THE INVENTION

The disclosed implementations of the present invention described herein provide a shock absorbing system for force attenuation, force modification or reduction, employing an envelope having a chamber containing a first working fluid, the envelope deformable in response to the impulse to absorb impulse energy. A plurality of resilient supplemental absorber elements dispersed within the chamber. The plurality of resilient supplemental absorber elements are deformable in response to the force or impact to assist in absorbing energy and provide additional resilient restoring force to return the envelope to a pre-impulse shape after the impulse. In alternative implementations, a unitary cell for impact energy dissipation employs an envelope having a chamber containing a first working fluid and an inner element contained within the chamber and having an inner chamber containing a second working fluid. The first working fluid and second working fluid have a pressure differential.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
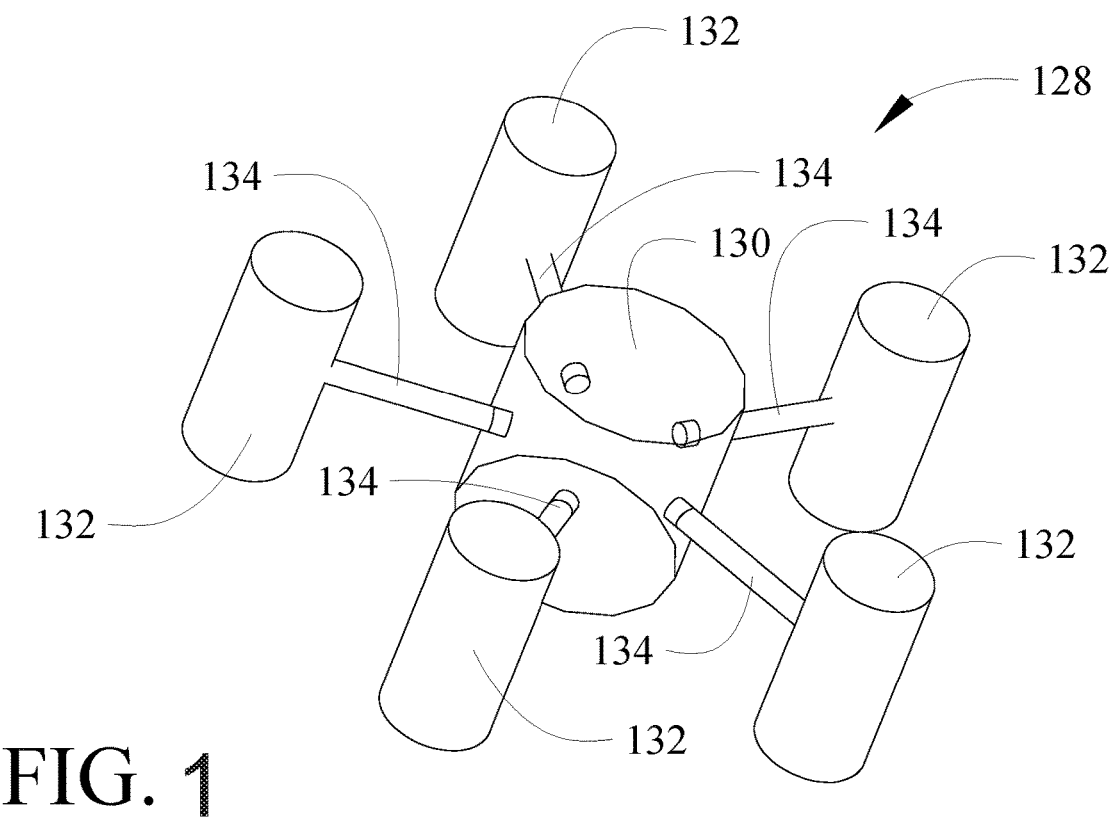
FIG. 1 is perspective view of a unitary cell employing multiple compression cylinders spaced around and in fluid communication with a central accumulator.

Referring to the drawings for description of the invention an example of the arrangement of the shock absorbing system in a unitary cell 128 is shown in FIG. 1. An accumulator or reservoir 130 is surrounded by multiple compressible cylinders 132 (also described as chambers or columns) which are oriented substantially perpendicular to an impact surface, described in greater detail subsequently. For the embodiment shown a pentagonal arrangement of the compressible cylinders is shown, however, in alternative embodiments more or fewer cylinders may be associated with the reservoir. Each of the compressible cylinders 132 is in fluid communication with the reservoir 130 through conduits 134. Spacing of the cylinders and reservoir in FIG. 1 are exaggerated for clarity. As previously described, the reservoir and cylinders are filed with a first working fluid and upon shock or impact on one or more of the compressible cylinders 132 the cylinder(s) partially or fully collapse forcing the working fluid through the conduit into the reservoir 130 depending on the characteristics of the impact force. Reservoir 130 and compressible cylinders 132 employ resilient materials to allow expansion to their equilibrium state after release of the impact force. Pressure increase of the working fluid also assists in expansion of the compressible cylinders. If fluid transfer has occurred, upon release of the impact force from the compressible cylinders 132, the pressurized working fluid from reservoir 130 is forced back through conduit 134 to assist in expansion the compressible cylinder and equalize pressure. As described for prior embodiments, a flow restriction may be employed in conduit 134 for control of the flow of working fluid.

Figure 2:
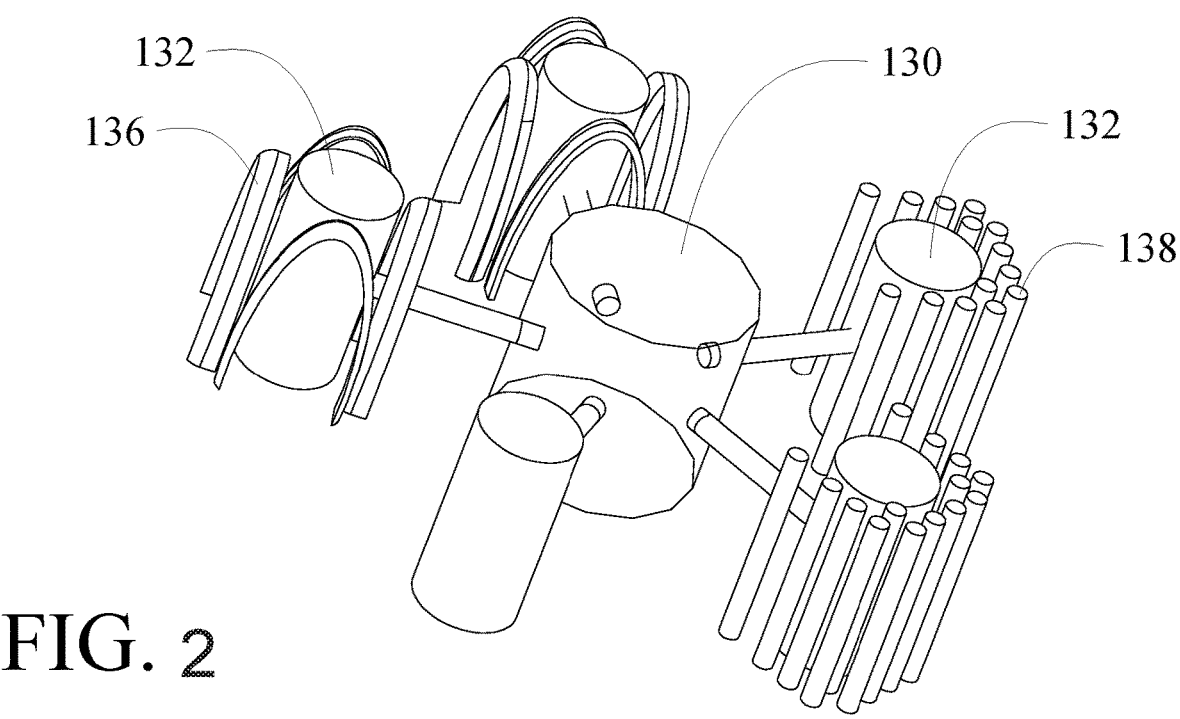
FIG. 2 is a perspective view of the unitary cell demonstrating additional resilient elements in either arcuate filament or vertical pillars.

Expansion of the compressible cylinders may be enhanced through the use of mechanical restoring elements to assist the hydrodynamic force from the pressurized reservoir in erecting the cylinder from a collapsed state. As shown in FIG. 2, arcuate filaments 136 may be employed to surround the compressible cylinders 132 as shown for two cylinders in the figure. As previously described for an earlier embodiment, the arcuate filaments may be substantially perpendicular to each other and surround the compressible cylinder. Alternatively, rod like upstanding filaments or pillars 138 may be employed to surround the cylinders 132 as shown for two cylinders in the figure. The arcuate filaments 136 or pillars 138 are resiliently flexible and oriented substantially perpendicular to the impact surface and also provide a cushioning or shock absorbing capability to supplement the compressible cylinders in attenuating the impulse force. In addition, the arcuate filaments and pillars may provide support against shearing forces. Upon deformation, the arcuate filaments 136 or pillars 138 resiliently return to their original shape thereby urging an envelope, upper plate or liner (as will be described subsequently) upward to assist in expansion of collapsible cylinders 132 with pressurized working fluid from the reservoir 130.

Figure 3:
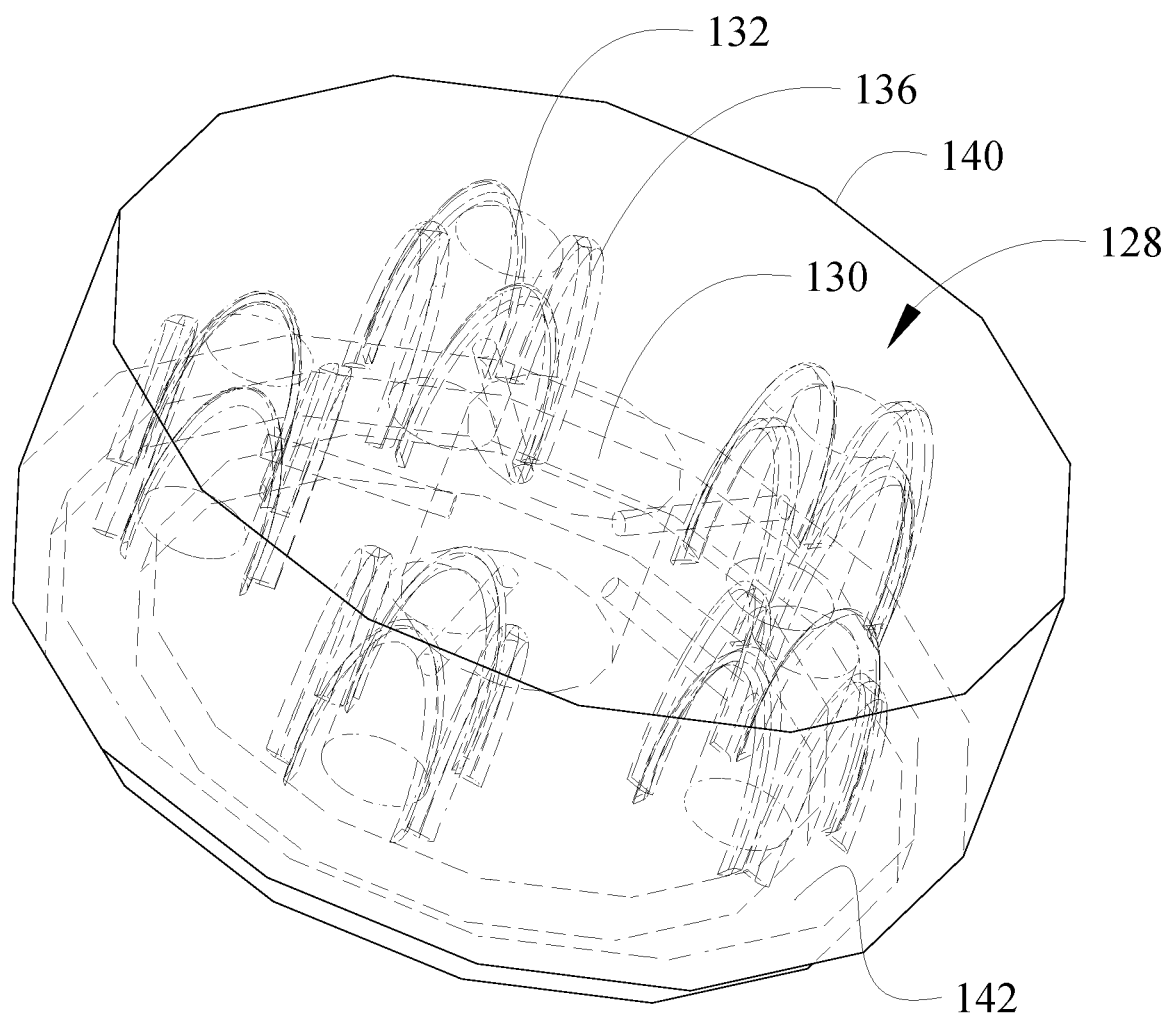
FIG. 3 is a perspective hidden line representation of the unitary cell encapsulated in a membrane containing a secondary wording fluid.
Figure 4:
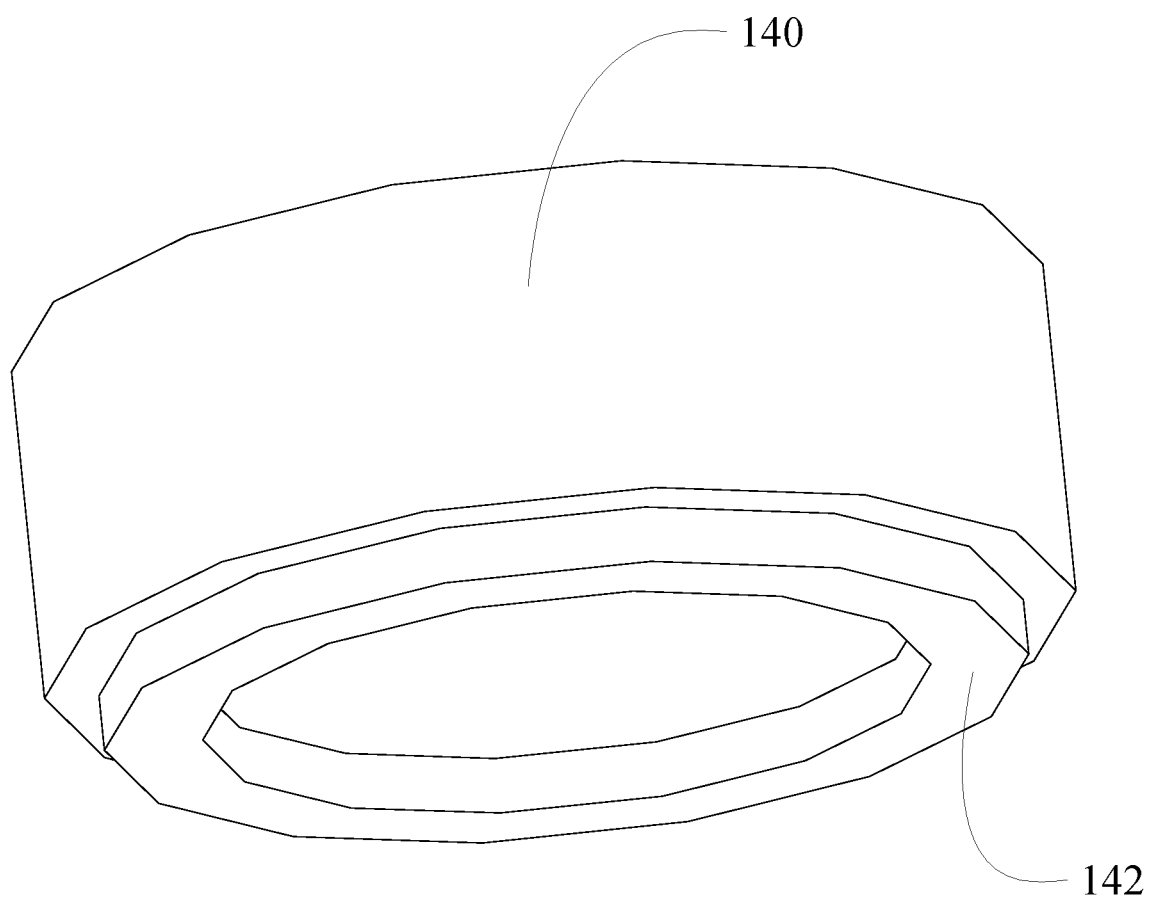
FIG. 4 is a lower perspective view of the membrane encapsulated unitary cell with a hook and loop fastener ring for attaching the cell to a wall of a helmet or impact pad.

The structure of the unitary cell 128 may be encapsulated in an envelope 140 as shown in FIG. 3. The envelope 140 may be a contiguous material such as a foam, rubber, thermoplastic or elastomeric or may be a covering providing a chamber around the reservoir and cylinders which may be filled with a second working fluid (as will be described in greater detail subsequently). For the embodiment of FIG. 3 arcuate filaments 136 are employed to surround the compressible cylinders 132 as previously described. The arcuate filaments 136 may be distributed throughout the envelope. The arcuate filaments 136 provide restoring force acting on the envelope 140 to assist the expansion of the compressible cylinders after compaction as previously described. Pillars or columns may be employed in conjunction with or to replace the arcuate filaments or no additional mechanical restoring elements may be employed. The encapsulated unitary cell 128 may then be affixed to a helmet shell, pad, wall, foot bed, liner or similar surface, wall or any structure for which shock absorbing capability is desired. For the embodiment shown, as an example best seen in FIG. 4, hook and loop fasteners 142 may be employed on one or multiple outer surfaces of the envelope 140 to accomplish the attachment and allow the removal of the unitary cell, as will be described in greater detail subsequently. Alternatively, an adhesive or other form of attachment may be employed to bond the unitary cell to the surface. Pliable or severable adhesives may be employed to allow debonding of the unitary cell envelope from the surface.

Figure 5:
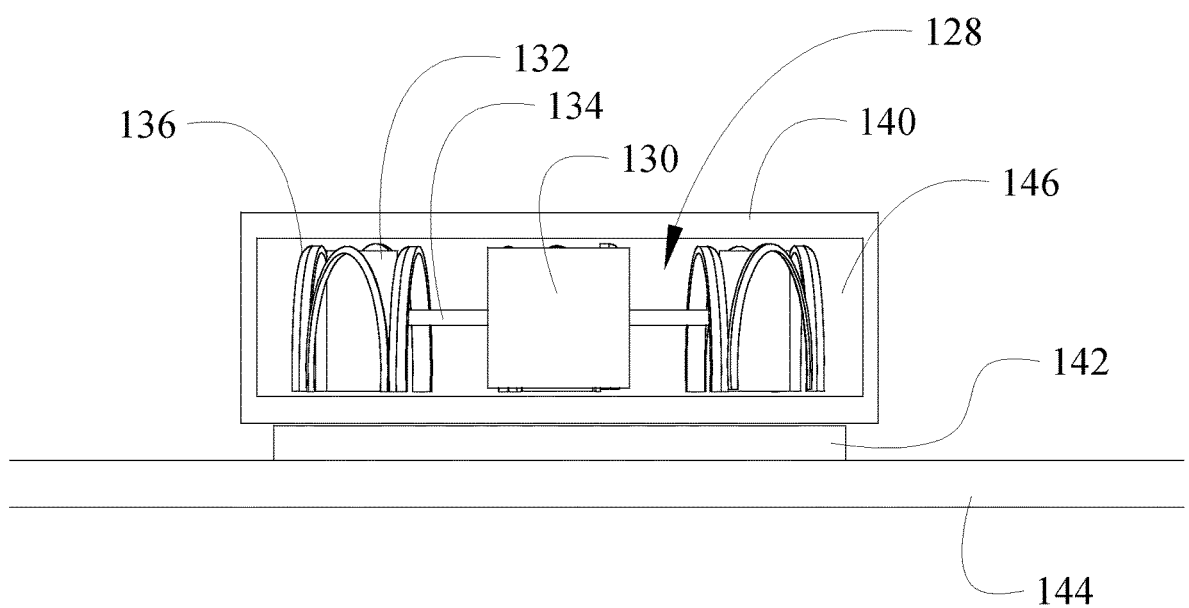
FIG. 5 is a side cross section view of the encapsulated unitary cell as attached to the wall.
Figure 6:
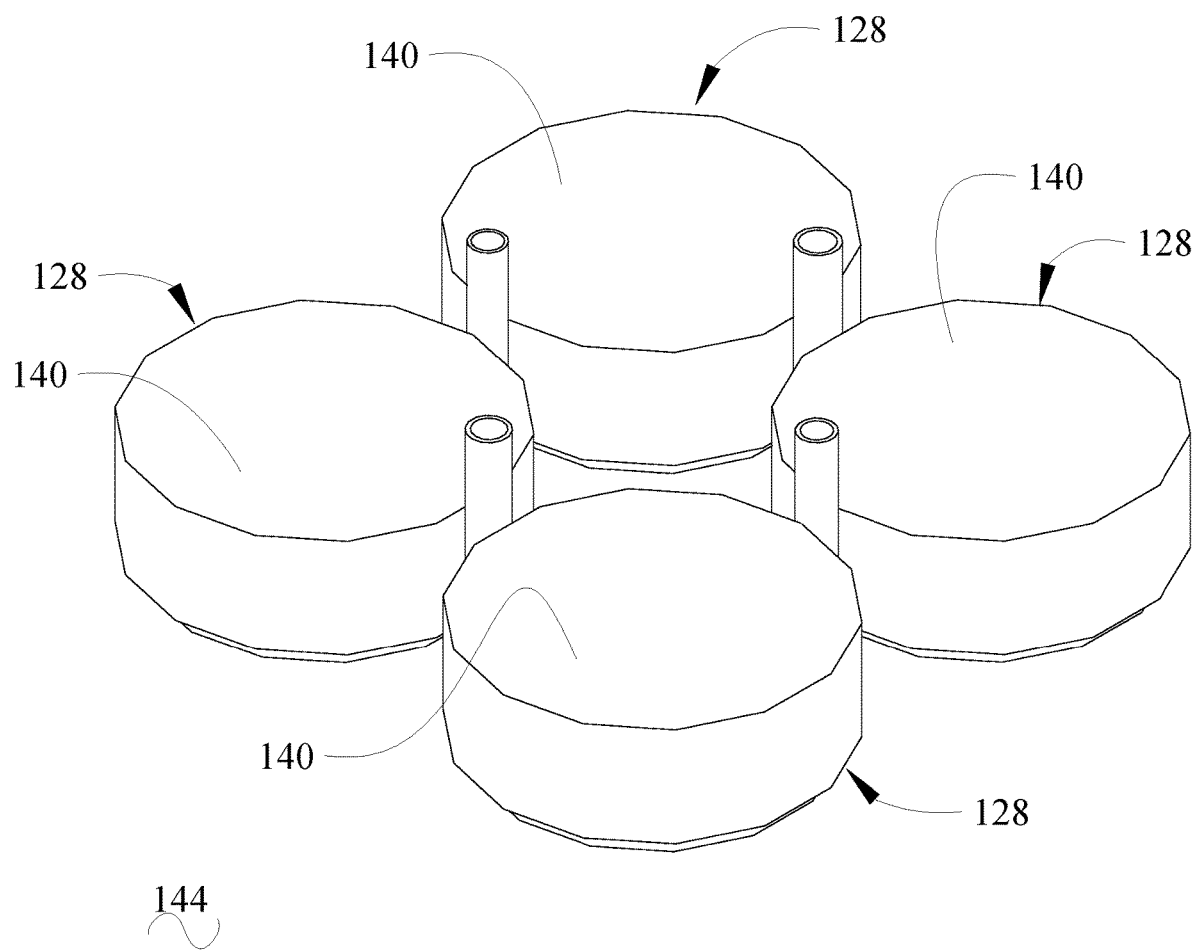
FIG. 6 is a perspective view of multiple unitary cells arranged with transverse cooling tubes.

FIG. 5 shows the unitary cell 128 attached to a surface 144. The envelope 140 is shown forming a chamber 146 in which a second working fluid may be contained. The second working fluid bathes the reservoir 130, compressible cylinders 132 and arcuate filaments 136 and may provide cooling, as will be described subsequently, as well as shock absorbing capability. Multiple unitary cells may be applied in a desired pattern to surface 144 as shown in FIG. 6; for example, the interior surface of a motorcycle or football helmet or impact pad such as shoulder pads or shin guards for sports activities. The unitary cells may be attached using hook and loop fasteners on the envelope as previously described. While shown as a ring, the hook and loop fasteners may be employed as a patch and, in embodiments in which an envelope is not used around the compressible cylinders and reservoir of the unitary cell, the hook and loop ring or patch may be affixed directly to the cylinders and/or reservoir. Other types of adhesives can alternatively be used to attach the cells to the impact surface. The use of unitary cells removably attached to the surface as described allows removal and replacement if the compressible cylinders, reservoir or envelope should rupture or show excessive wear. The first working fluid may be colored and the envelope semi or fully transparent to allow easy recognition of a ruptured component.

Figure 7:
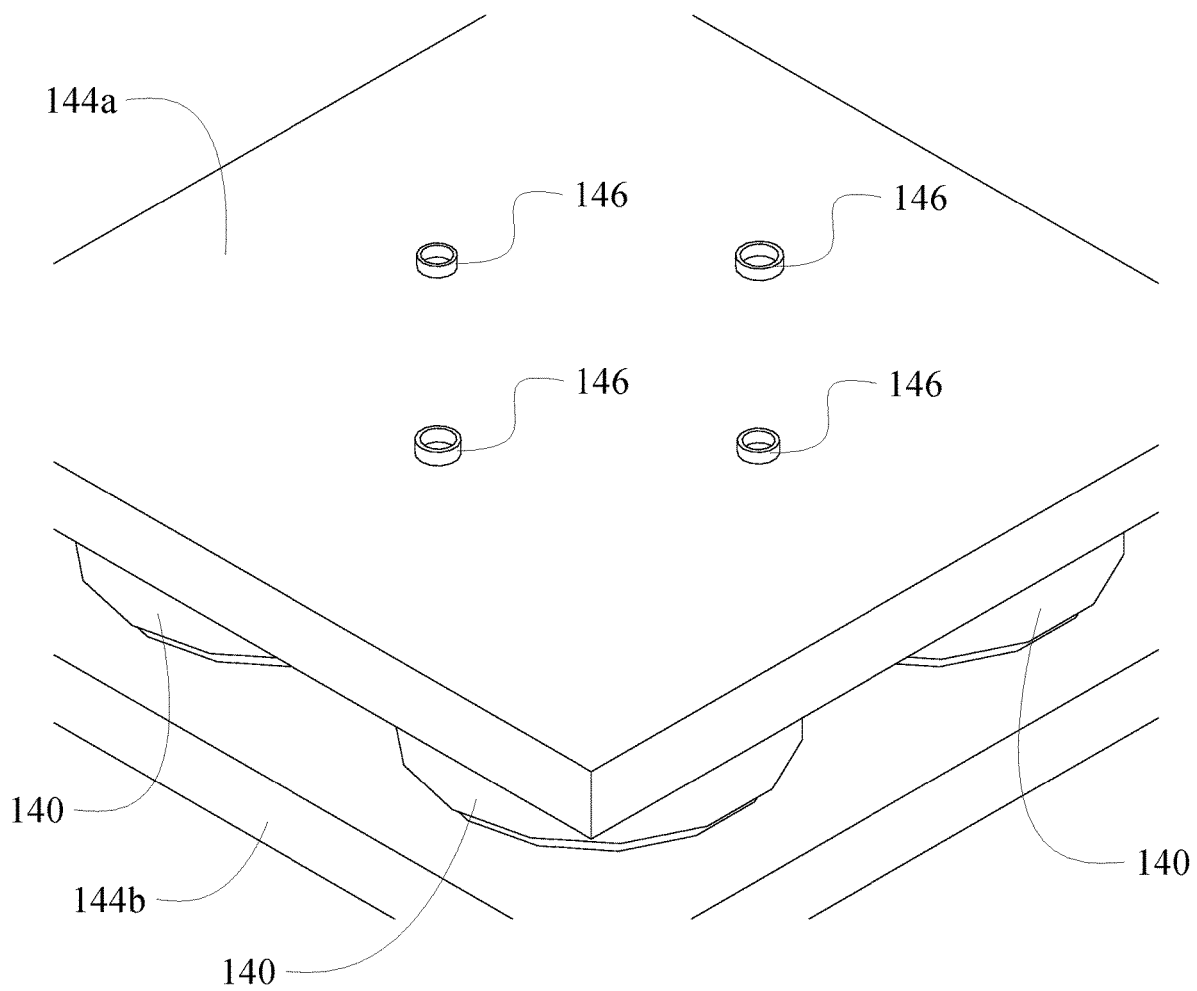
FIG. 7 is a perspective of a liner and bed surrounding the grouping of unitary cells with the extending transverse cooling tubes.

Cooling of the unitary cells 128 may be enhanced by the use of transverse cooling tubes 146. A first embodiment of the cooling tubes is shown in FIG. 6 wherein the tubes are located adjacent to and in intimate contact with the envelopes 140 of the unitary cells 128. As seen in FIG. 7, an upper plate 144*a* and lower plate 144*b* which may be such elements as an external surface of a helmet and a helmet liner or foot bed and sole liner which encompass the unitary cells may be pierced by the transverse cooling tubes 146 for ventilation. Heat transfer is provided through conduction between the envelopes 130, convection in the second working fluid in the envelope surrounding the reservoir and compressible cylinders, and convention of air through the transverse cooling tubes.

Figure 8:
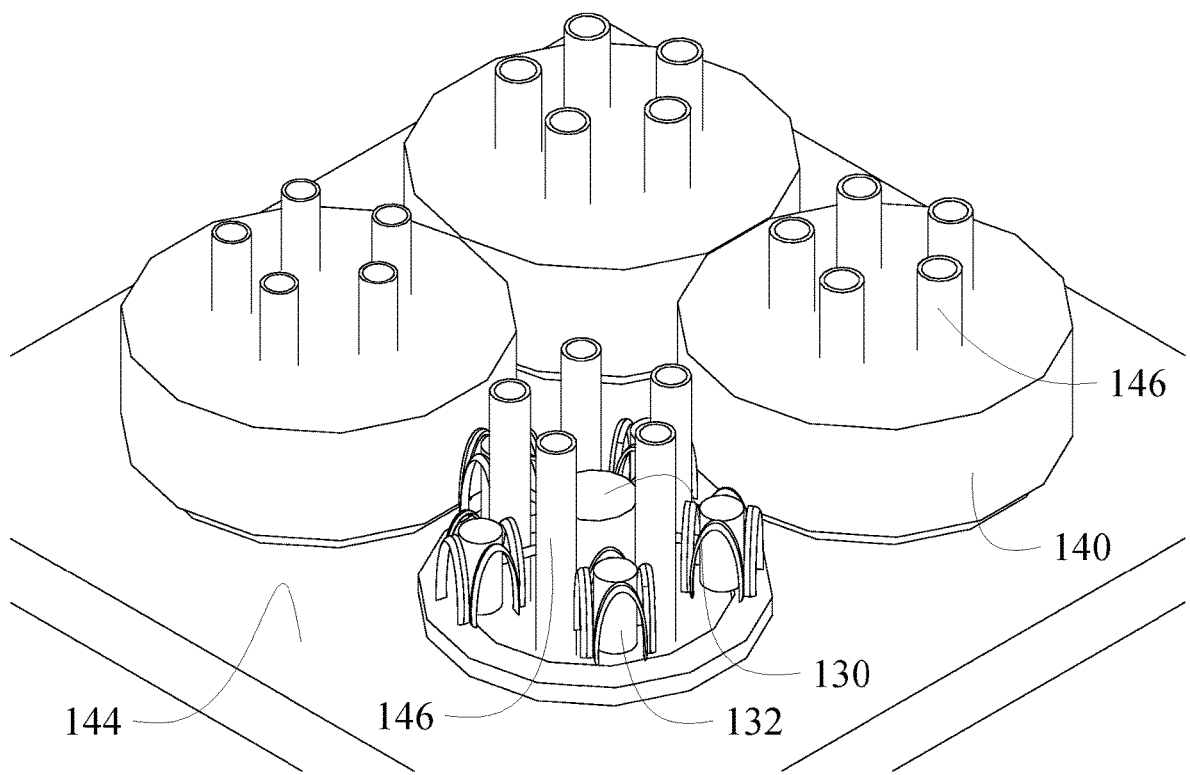
FIG. 8 is a perspective view of a bed with multiple unitary cells having transverse cooling tubes integral to each cell with the encapsulation removed from one cell for clarity.

As an alternative, the transverse tubes 146 may extend through the envelopes 140 of the unitary cells 128 as seen in FIG. 8. This embodiment provides direct contact of the transverse tubes with the second working fluid. The transverse tubes 146 may extend through the surface 144 and through any opposing surface abutting the unitary cell(s). While shown as extending from both surfaces, if the envelopes 140 constitute the inner surface (for example in a helmet embodiment), the transverse tubes may terminate flush with the surface of the envelope 140.

Figure 9:
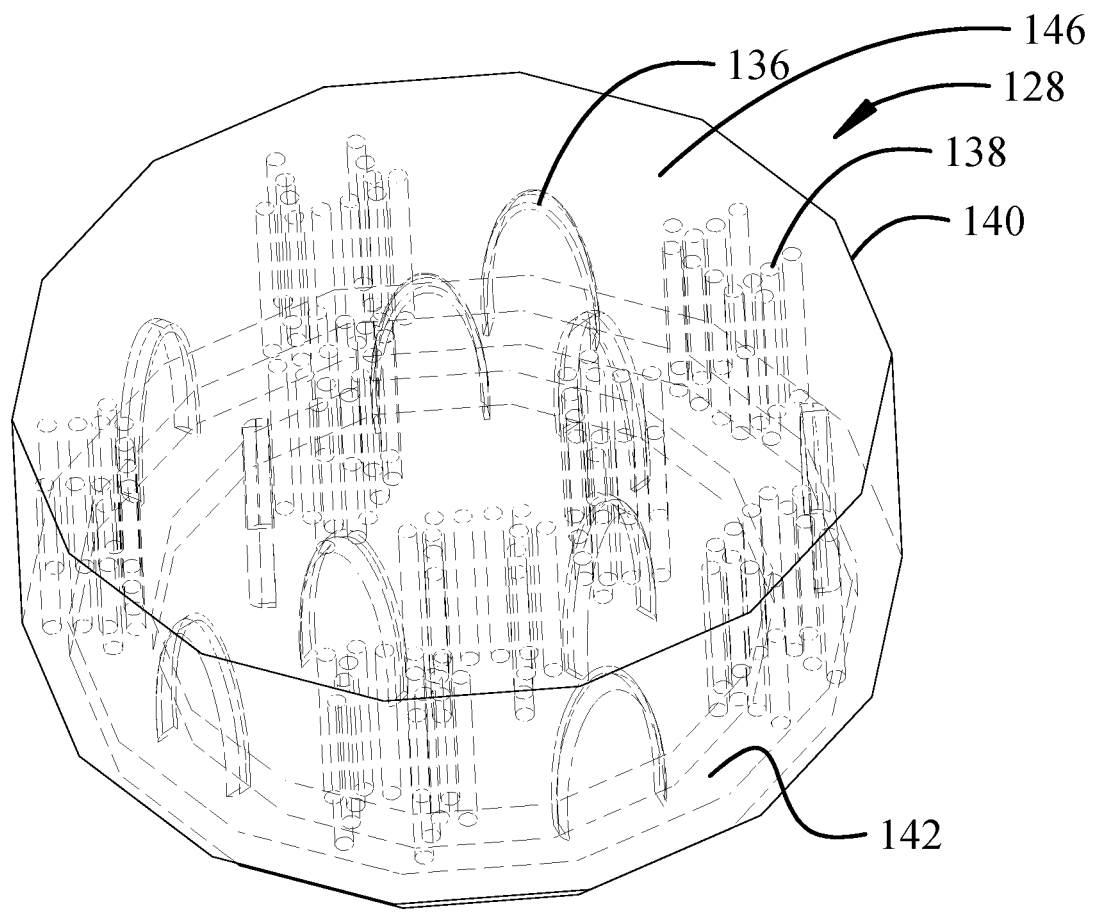
FIG. 9 is a perspective hidden line representation of an envelope having a chamber containing a first working fluid with pluralities of resilient supplemental absorber elements including arcuate filaments and resilient pillars.

Returning to FIG. 3, the unitary cell 128 may be simplified with solely an envelope 140 containing a working fluid in the chamber 146 at a first pressure as shown in FIG. 9. The envelope 140 may be a deformable material with elastic properties to provide material resilience. As an example, the elastomer Butyl rubber could be used for creation of the envelope using one of various molding processes such as injection molding.

The envelope 140 in the examples shown in the drawings is cylindrical in shape but other geometric cross sections may be employed. The encapsulated unitary cell 128 may be affixed to a helmet shell, pad, wall, foot bed, liner or similar surface, wall or any structure for which shock absorbing capability is desired. For the embodiment shown in FIG. 9, hook and loop fasteners 142 may be employed on one or multiple outer surfaces of the envelope 140 to accomplish the attachment and allow the removal of the unitary cell, as previously described.

Figure 10:
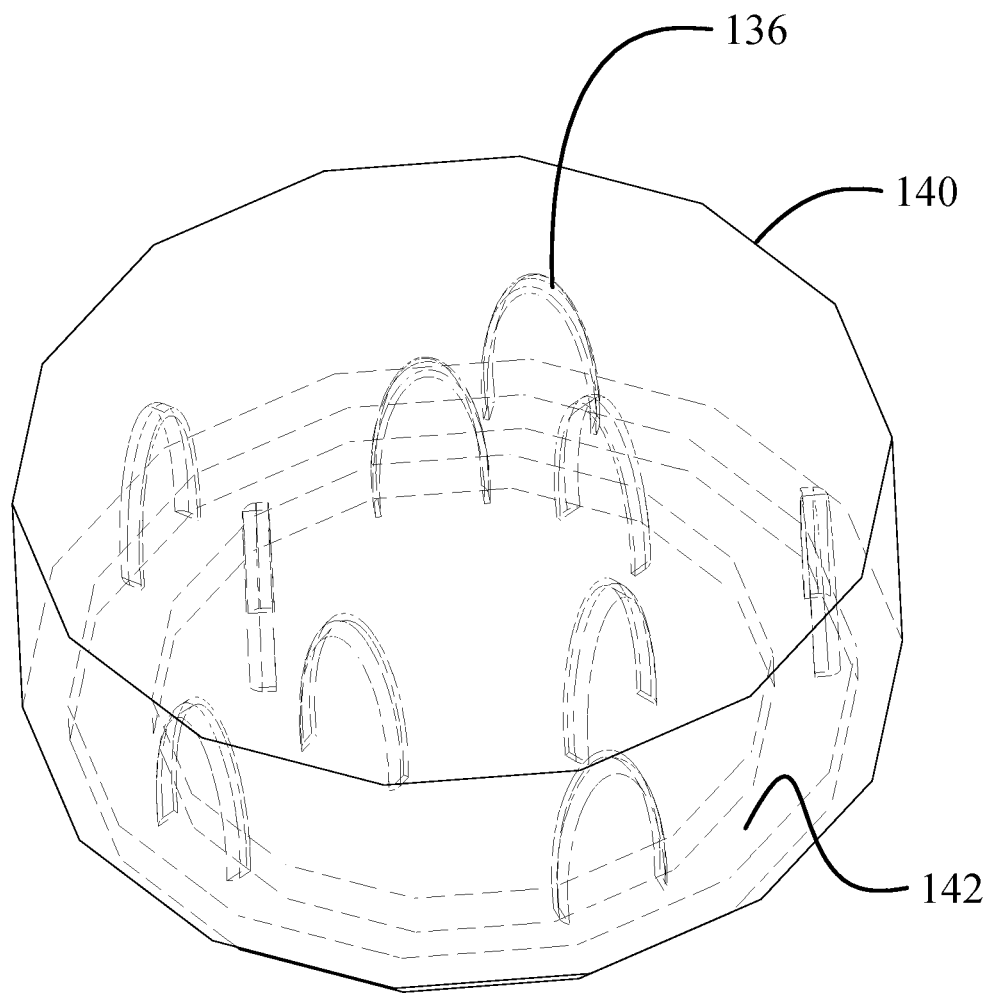
FIG. 10. is a perspective hidden line representation of an envelope having a chamber containing a first working fluid with a plurality of arcuate filaments.
Figure 11:
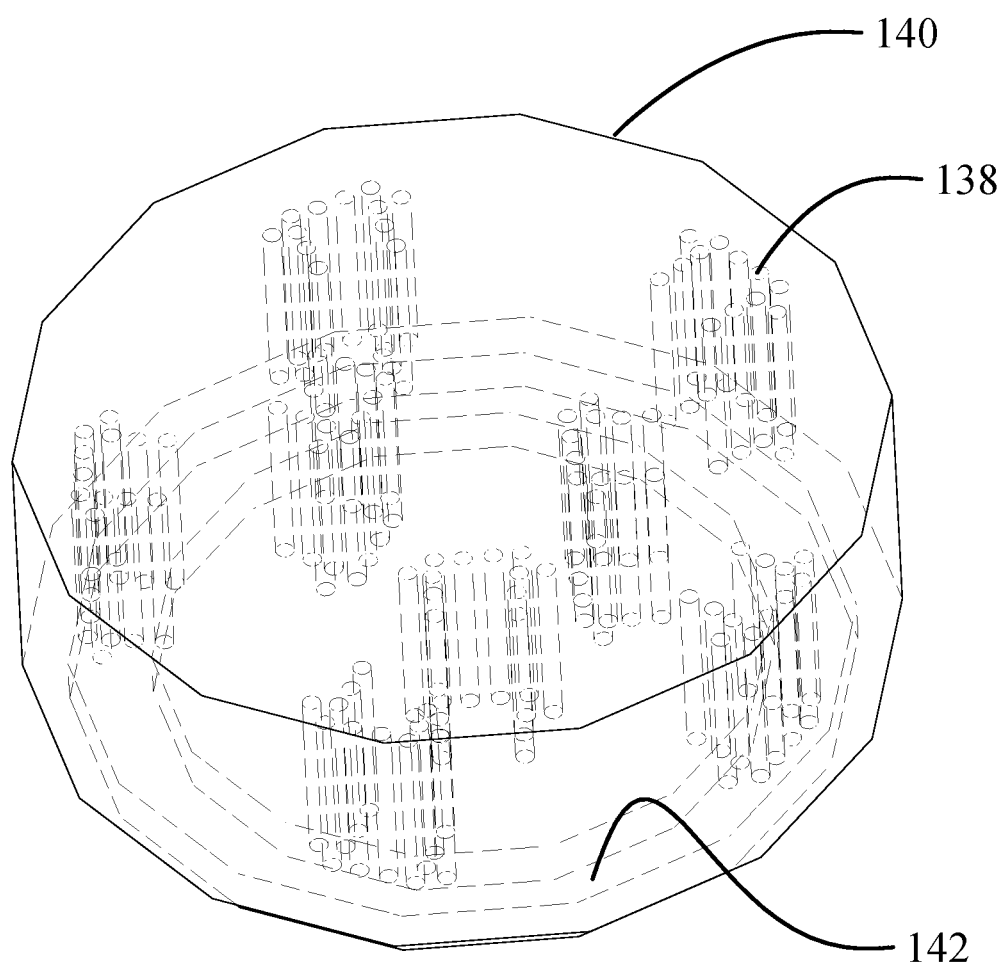
FIG. 11. is a perspective hidden line representation of an envelope having a chamber containing a first working fluid with a plurality of resilient pillars.

Compression of the envelope 140 by an applied force will deform the envelope shape, stretching the envelope 140 to allow displacement of the working fluid. The amplitude of the impact force is damped by the deformation and displacement of the envelope and working fluid. A plurality of resilient supplemental absorber elements such as arcuate filaments 136 and resilient pillars 138 may be dispersed within the chamber 146 which deform in response to the impact force so as to attenuate the amplitude of the force, provide energy conversion, as well as potentially providing additional resilient restoring force to return the envelope to a pre-impulse shape as previously described. The arcuate filaments and resilient pillars 138 may be used in combination as represented in FIG. 9 or arcuate filaments 136 may be employed alone as shown in FIG. 10 or resilient pillars employed alone as shown in FIG. 11. The arrangement, height and spacing of the arcuate filaments 136 and resilient pillars 138 in FIGS. 9-11 is solely representative as to position and density.

Figure 12A:
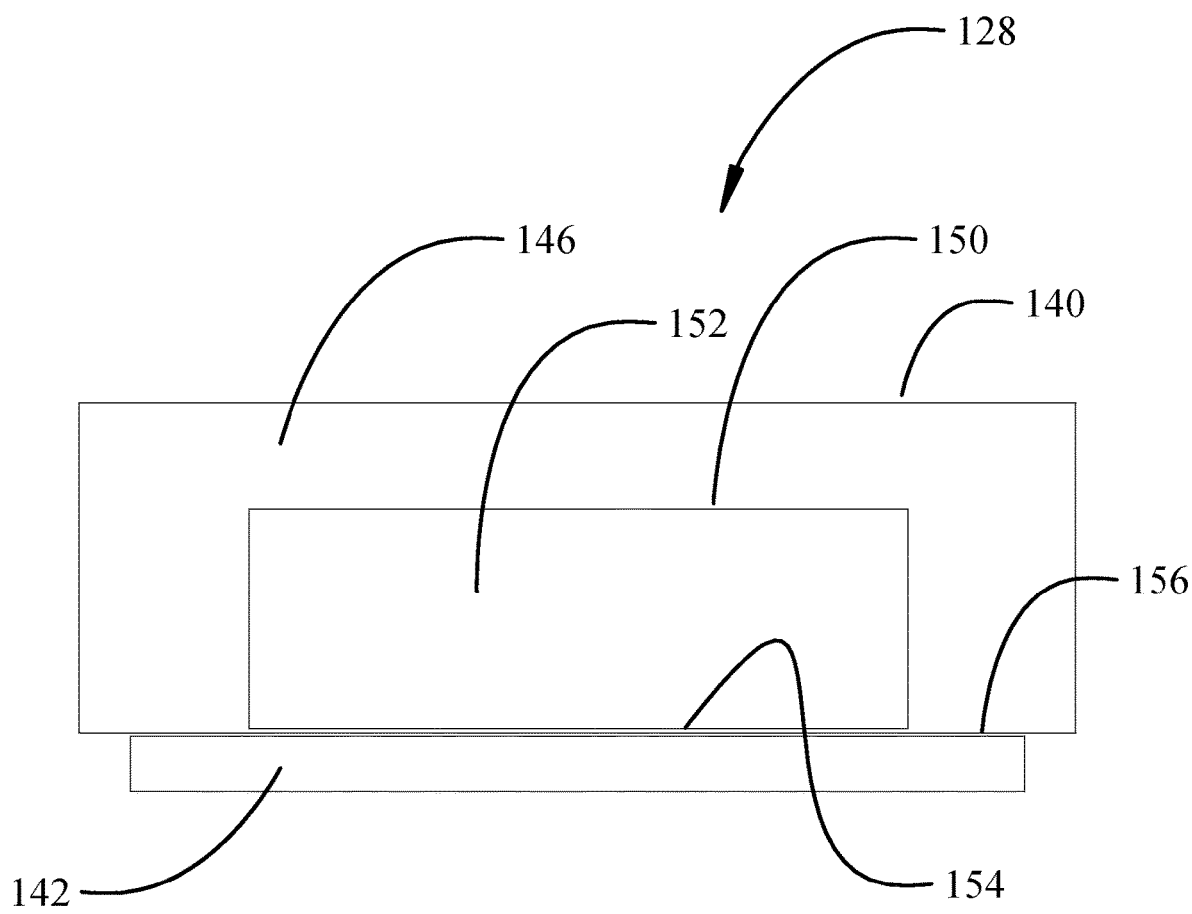
FIG. 12A is a side section view of a unitary cell incorporating an envelope having a chamber with an inner element.
Figure 12B:
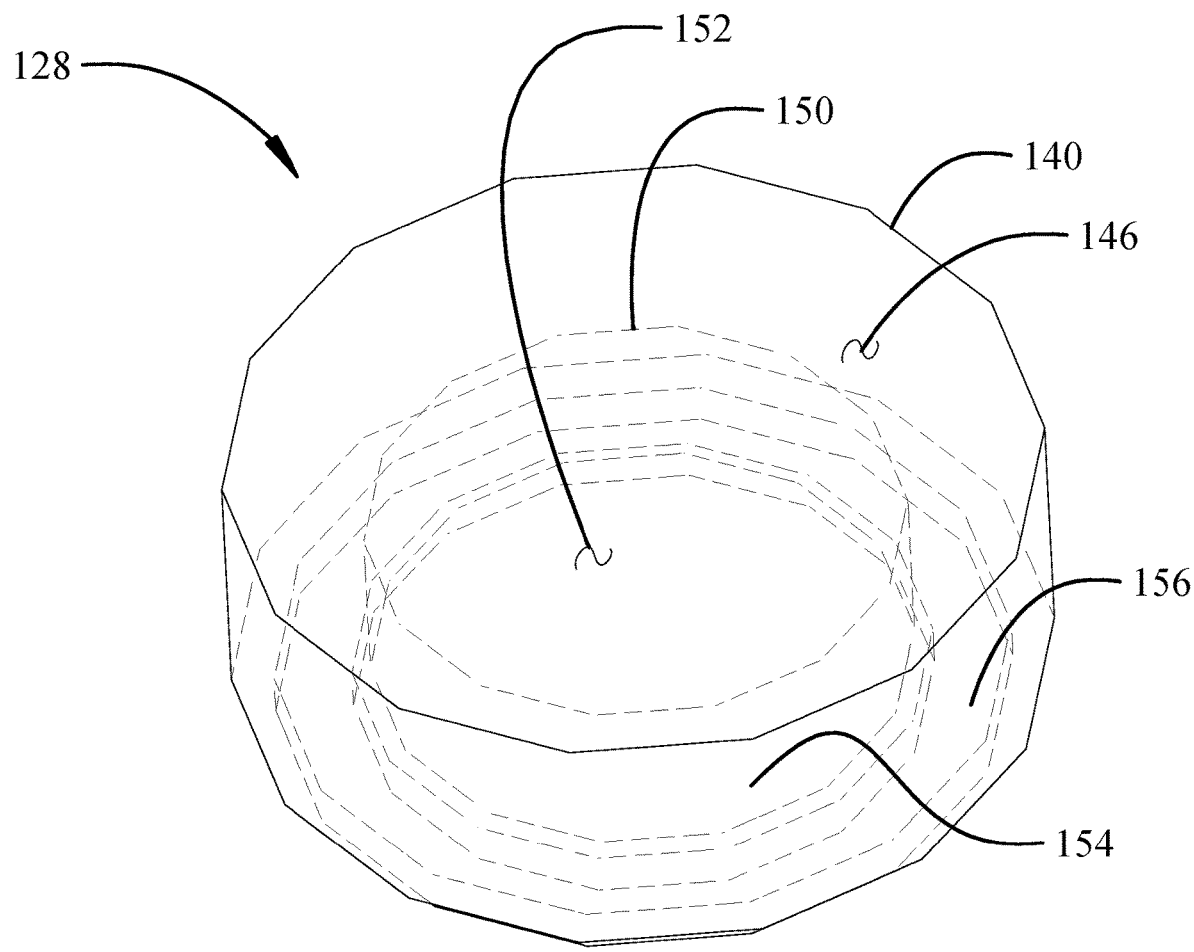
FIG. 12B is a perspective hidden line representation of the unitary cell of FIG. 12A.

The unitary cell 128 in alternative implementations employs an inner element 150 of smaller volume inside the chamber 146 of the envelope 140 as shown in FIGS. 12A and 12B. The inner element 150 is likewise formed of an elastic material such as an elastomer has a shape received in the envelope 140. The inner element will have an inner chamber 152 filled with a second working fluid. The first working fluid in chamber 146 of the envelope 140 and the second working fluid in inner chamber 152 of the inner element 150 may be the same and in exemplary implementations both the first working fluid and second working fluid are air. However, nitrogen or other inert gas or a liquid may also be employed.

The volume of the inner chamber 152 in the inner element 150 will depend on the application and will likely be approximately 50% of the volume of the chamber 146 of the envelope 140 with a nominal range of 20% to 80% of the chamber 14 volume. In the example shown in the drawings, a bottom surface 154 of the inner chamber 150 is supported on a bottom surface 156 of the envelope. Additionally, the pressure of the second working fluid in the inner element 150 may be different than the pressure of the first working fluid in the envelope 140. In typical examples, the pressures of the first working fluid and second working fluid will be maintained to provide a gradient between nominally 5 psi and 300 psi at initial conditions. The gradient may change during an impact as described subsequently]

Figure 13A:
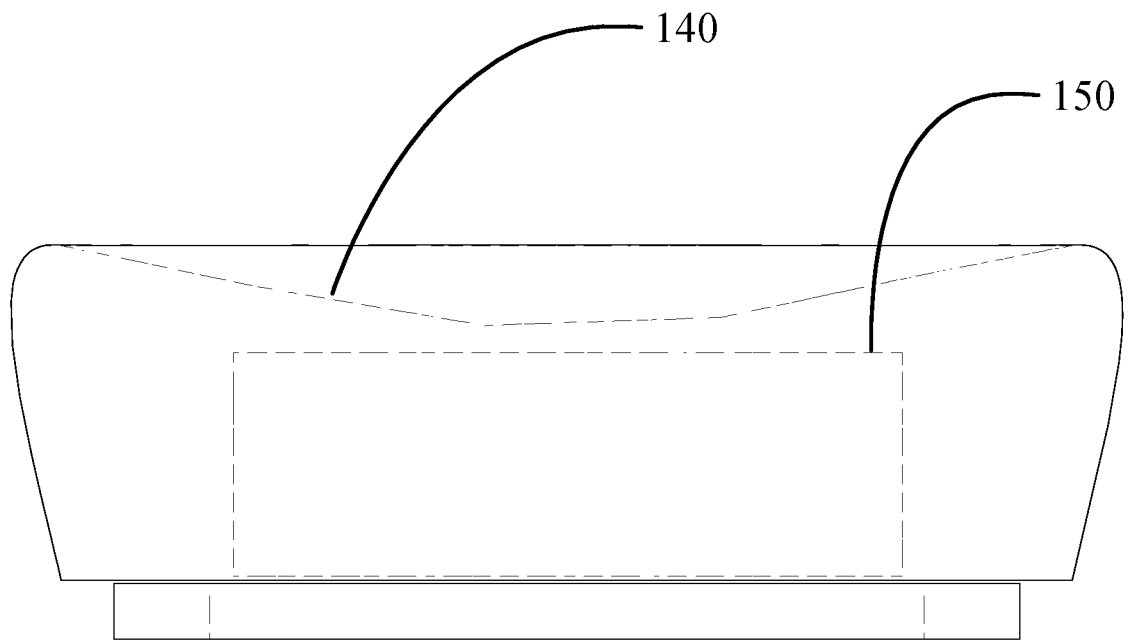
FIG. 13A is a side hidden line representation of impact deformation of the envelope of the unitary cell.
Figure 13B:
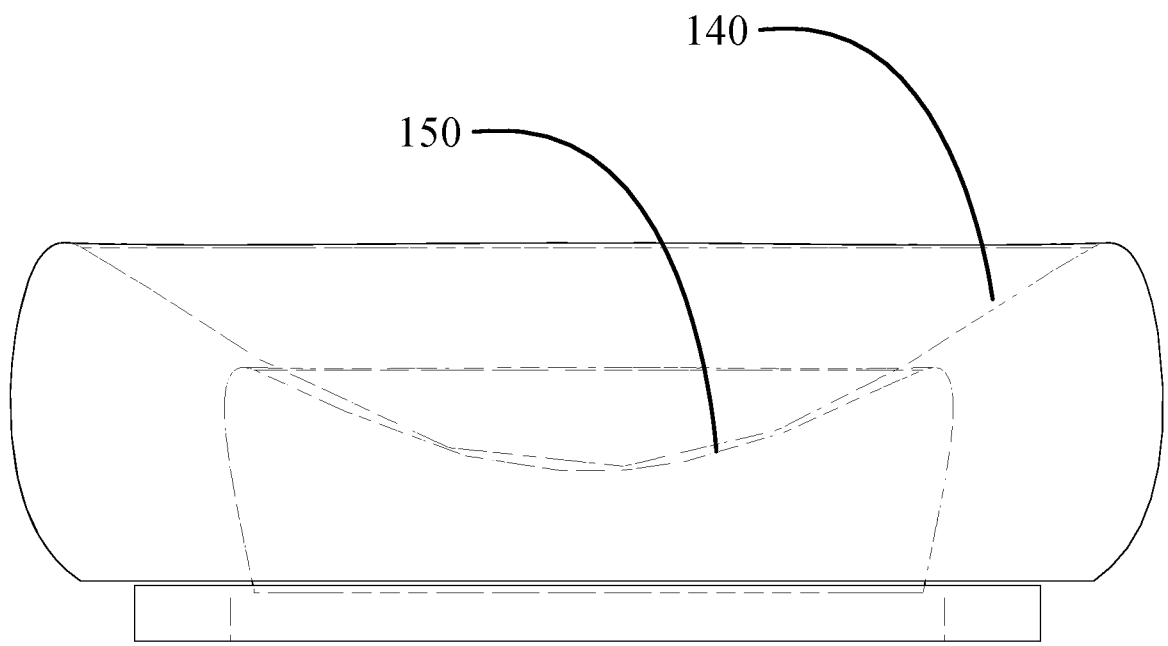
FIG. 13B is a side hidden line representation of impact deformation of both the envelope and inner element of the unitary cell.

The higher pressure of the second working fluid in the inner element 150 allows initial energy absorption of an impact impulse by the envelope and first working fluid with deformation as exemplified in FIG. 13A. If the impact force creates a subsequent pressure in the first working fluid greater than the second working fluid pressure, the inner element will compress to further absorb the impulse energy. If the the envelope 140 is deformed into contact with the inner element 150 by the impact, then the inner element will also begin to deform as seen in FIG. 13B. With either pressure in the first working fluid exceeding the pressure of the second working fluid or the envelope contacting the inner element, an altered energy absorption profile will result. The combination of the outer chamber, the pressurized first working fluid, the inner chamber, and contained second working fluid respond to the impact force in this dynamic manner. The alterations in pressures during deformation of elastic material, results in the damping of the amplitude of impact force. Modeling shown in FIGS. 13A and 13B is a simple gaseous pressure deformation of the upper surfaces and is representative only. Physical contact deformation will result in different deformation profiles.

Figure 14:
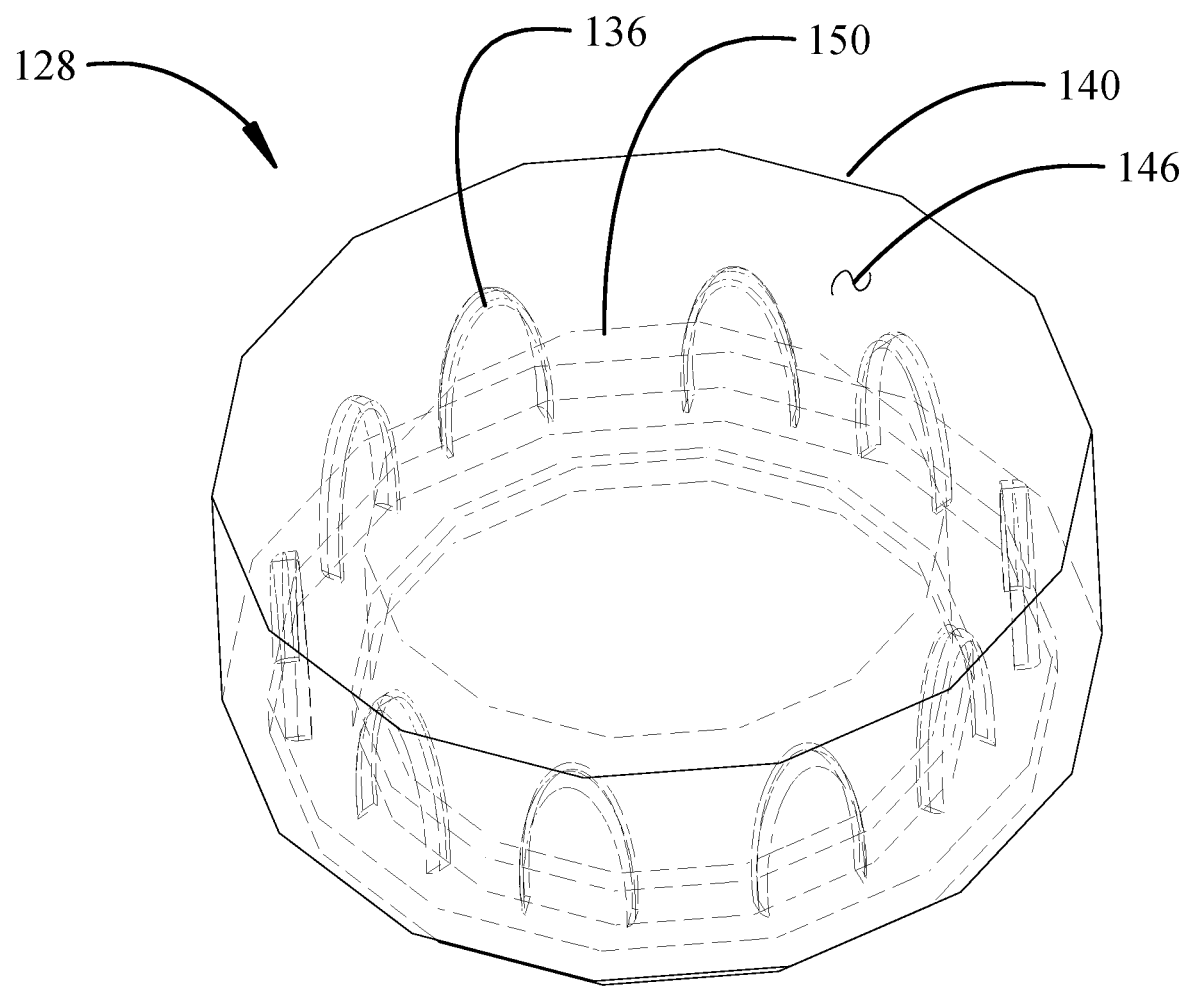
FIG. 14 is a perspective hidden line representation of the envelope of the unitary cell having a chamber containing a first working fluid with a plurality of arcuate filaments.
Figure 15:
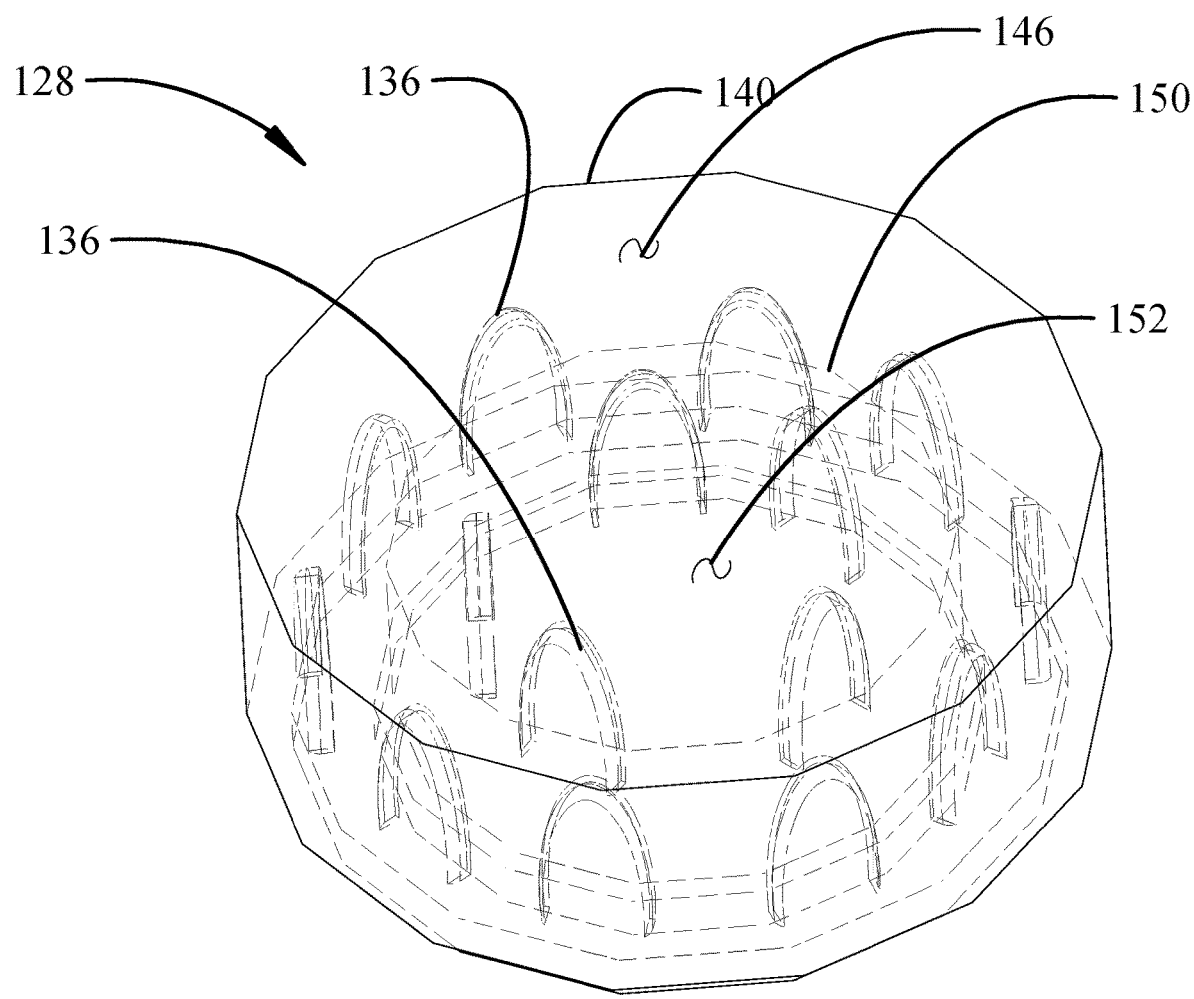
FIG. 15 is a perspective hidden line representation of the envelope and inner element of the unitary cell having both with a plurality of arcuate filaments.
Figure 16:
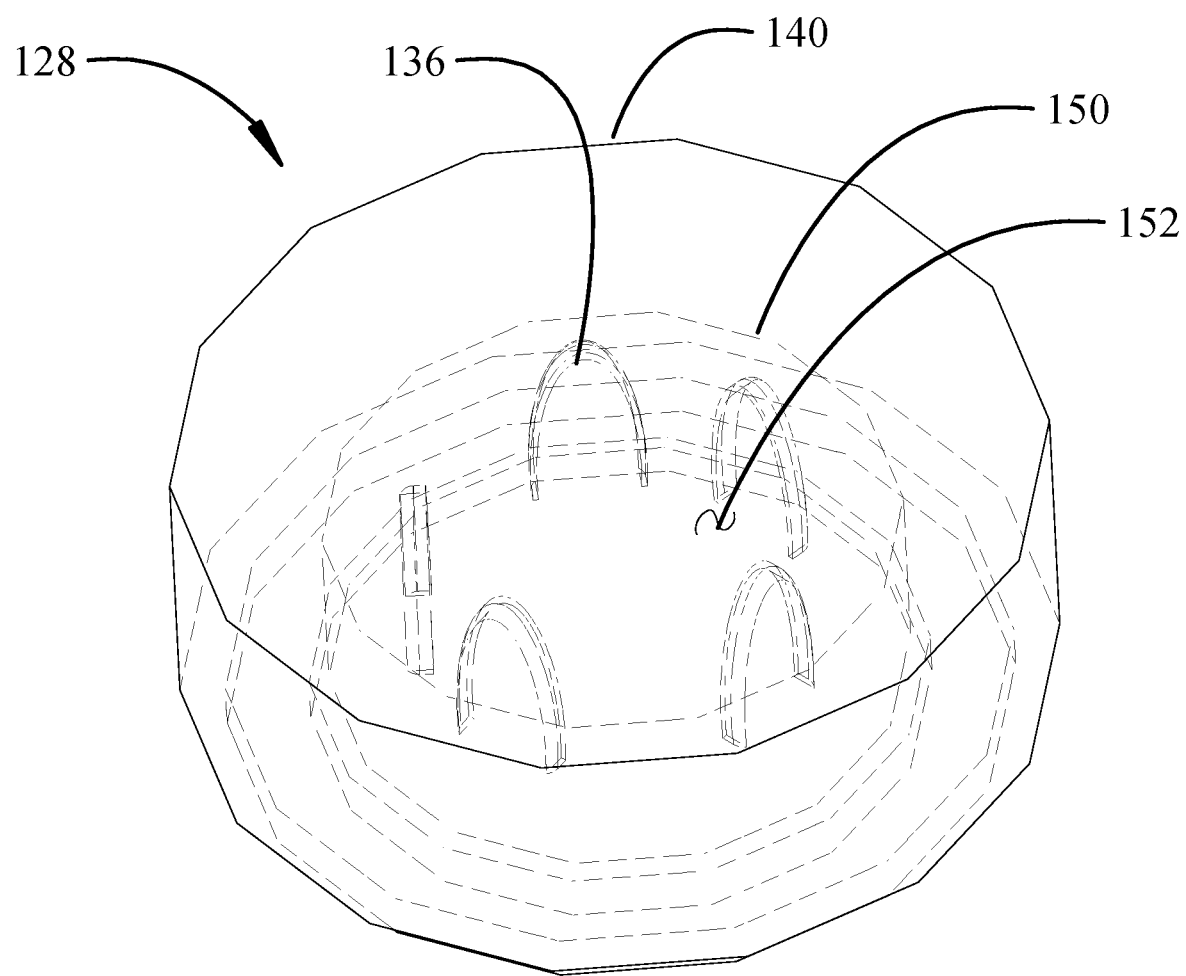
FIG. 16 is a perspective hidden line representation of the inner element of the unitary cell having an inner chamber containing a second working fluid with a plurality of arcuate filaments.

Arcuate filaments 136 are additionally employed in alternative implementations of the unitary cell 128 having an envelope 140 and inner element 150. The arcuate filaments 136 present in the chamber 146 of the envelope 140 surrounding the inner element as seen in FIG. 14 provide additional means of decreasing the impact force (or energy transformation) before or during engagement between the envelope 140 and the inner element 150. The height of the arcuate filaments in certain implementations is less than the height of the envelope 140 with contact and compression of the arcuate filaments occurring later in the deformation process after partial compression of the envelope 140 the continuing into a length of compression for the filaments. Upon compression of the arcuate filaments, the arcuate filaments provide restoring force over the length of compression to assist in at least partially restoring the envelop to a pre-impulse shape. Arcuate filaments 136 are alternatively present in both the inner element 150 and envelope 140 as seen in FIG. 15. In yet other alternative implementations the arcuate filaments 136 are present solely in the inner element 150 as seen in FIG. 16. Similar to the arcuate filaments in the envelope 130, the arcuate filaments in the inner element 150, height of the arcuate filaments in certain implementations is less than the height of the inner element 150 with contact and compression of the arcuate filaments occurring later in the deformation process after partial compression of the inner element 150.

Figure 17:
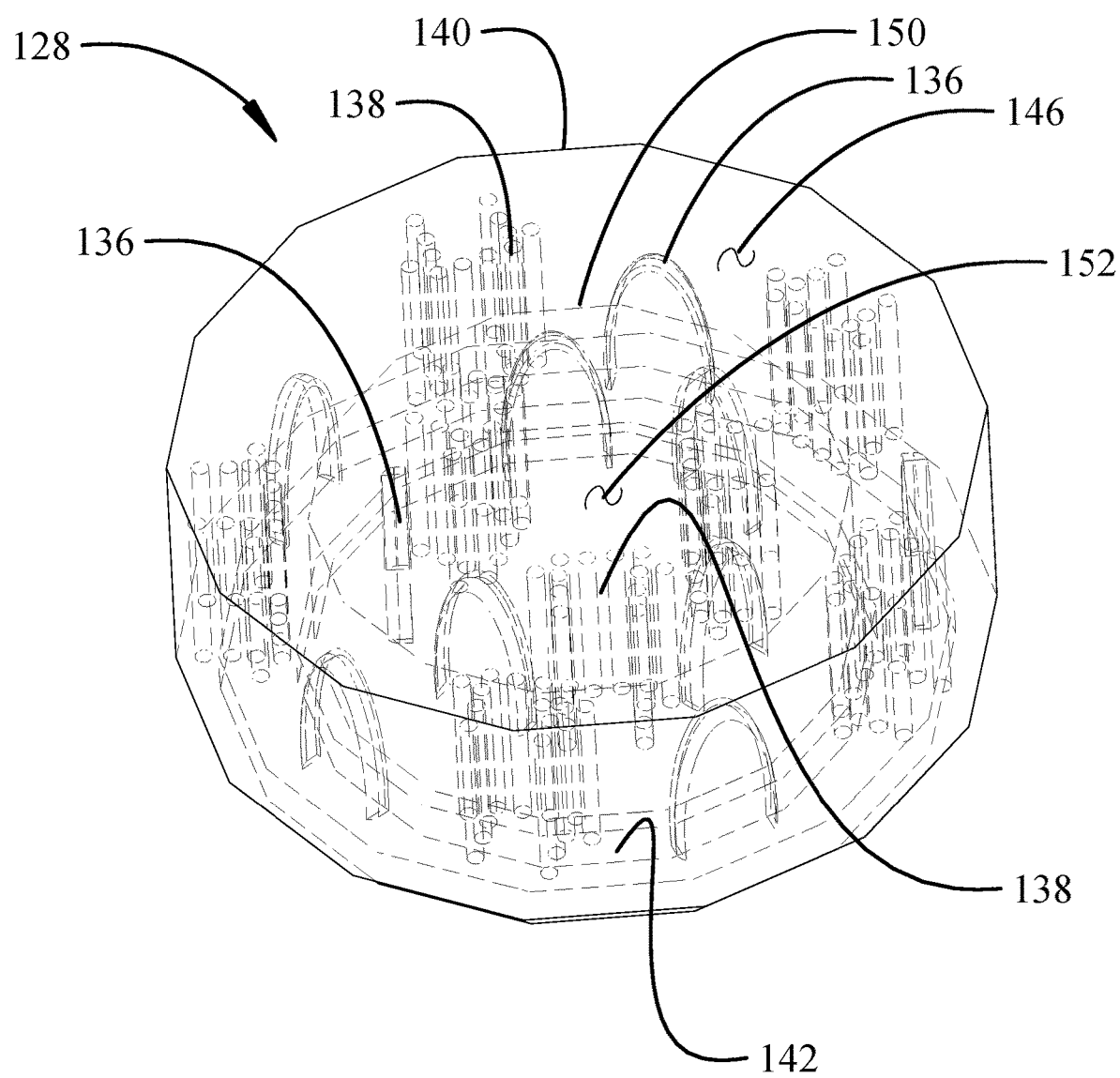
FIG. 17 is a perspective hidden line representation of the unitary cell having pluralities of resilient supplemental absorber elements including arcuate filaments and resilient pillars in both the envelope and inner element.

Similarly, as seen in FIG. 17, in certain implementations resilient pillars 138 are employed in conjunction with the arcuate filaments 136 in one or both of the envelope 140 and inner element 150. The arcuate filaments 136 may be replaced by resilient pillars 138 in one or both of the envelope 140 and inner element 150.

Figure 18:
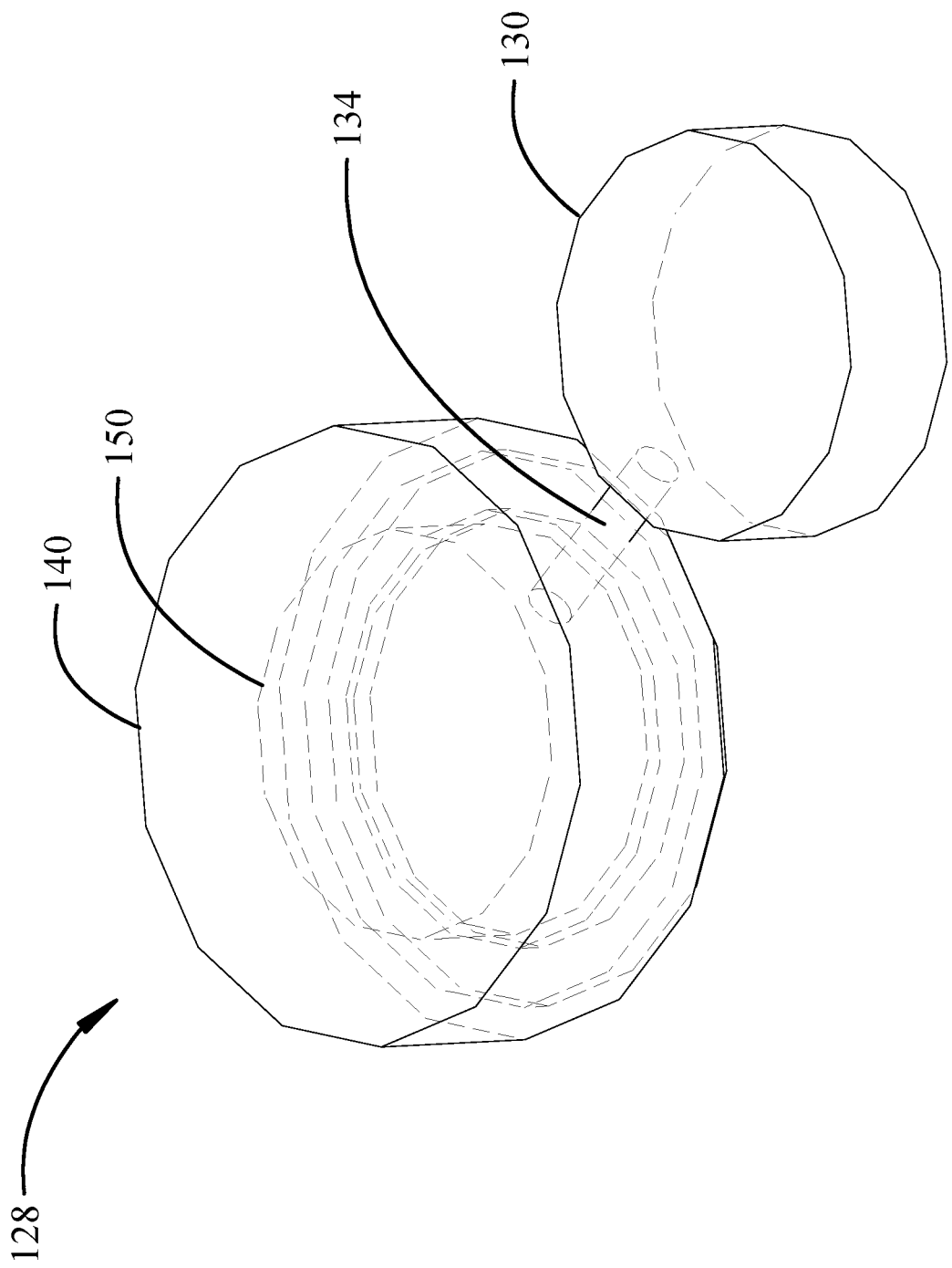
FIG. 18 is a perspective hidden line representation of the unitary cell with the inner element in fluid communication with a reservoir.

The inner element 150 in certain implementations is in fluid communication with an external reservoir 130 through a conduit 134 as seen in FIG. 18. Under force loading and increased pressure, fluid transfer between the inner chamber 152 and the external reservoir further assists force amplitude attenuation by physical transfer of the second working fluid between the inner chamber 152 and reservoir 130. Upon completion of the impact event, equalization of fluid pressures in the inner chamber 152 and reservoir 130 facilitates expansion of the inner element 150. The inner chamber 152 and envelope 140 may have any of the configurations shown and described with respect to FIGS. 14-17.

Figure 19A:
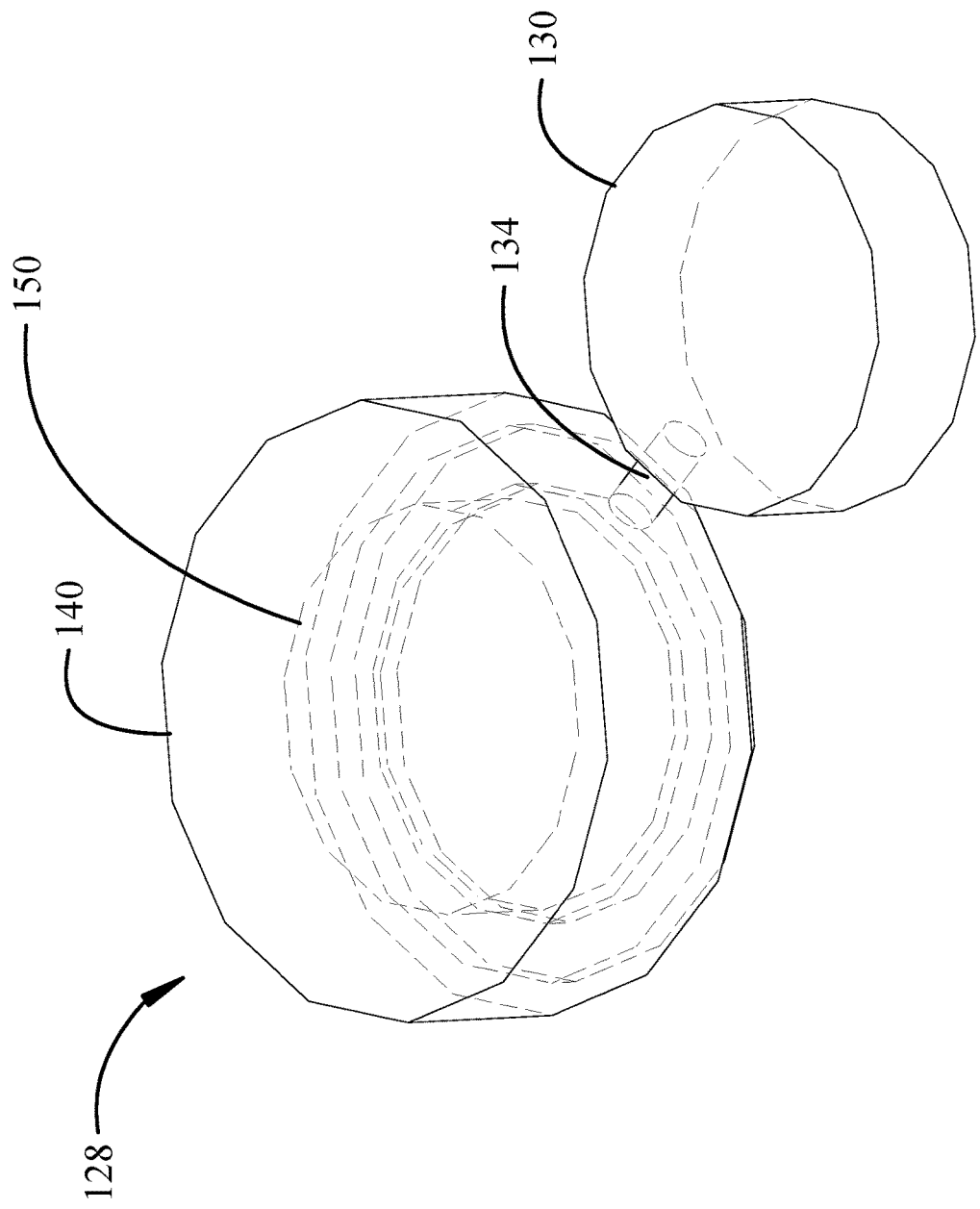
FIG. 19A is a perspective hidden line representation of the unitary cell with the envelope in fluid communication with a reservoir.
Figure 19B:
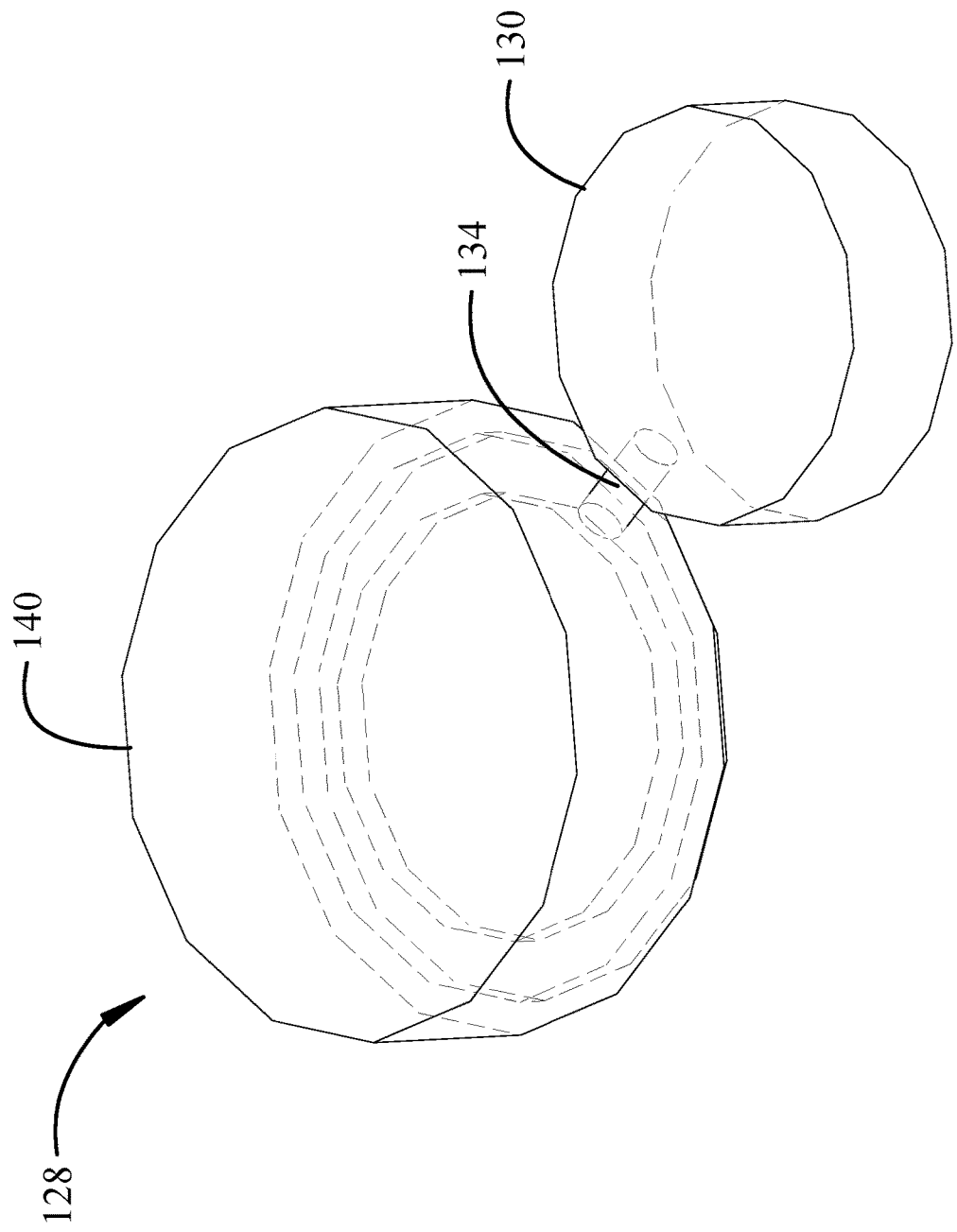
FIG. 19B is a perspective hidden line representation of the unitary cell without an inner element and with the envelope in fluid communication with a reservoir.

Similarly, the envelope 140 in certain implementations is in fluid communication with an external reservoir 130 through a conduit 134 as seen in FIGS. 19A and 19B (with or without an inner element 140). Under impact loading, fluid transfer between the chamber 146 and the external reservoir further facilitates damping of the magnitude of the impact force by physical transfer of the second working fluid between the chamber 146 and reservoir 130. Upon completion of the impact event, equalization of fluid volumes in the chamber 146 and reservoir 130 facilitates expansion of the envelope 140. For the implementation of FIG. 19A, the envelope 140 and inner element 150 may have any of the configurations shown and described with respect to FIGS. 14-17. For the implementation of FIG. 19B, the envelope 140 may have any of the configurations shown and described with respect to FIGS. 9-11.

Figure 20:
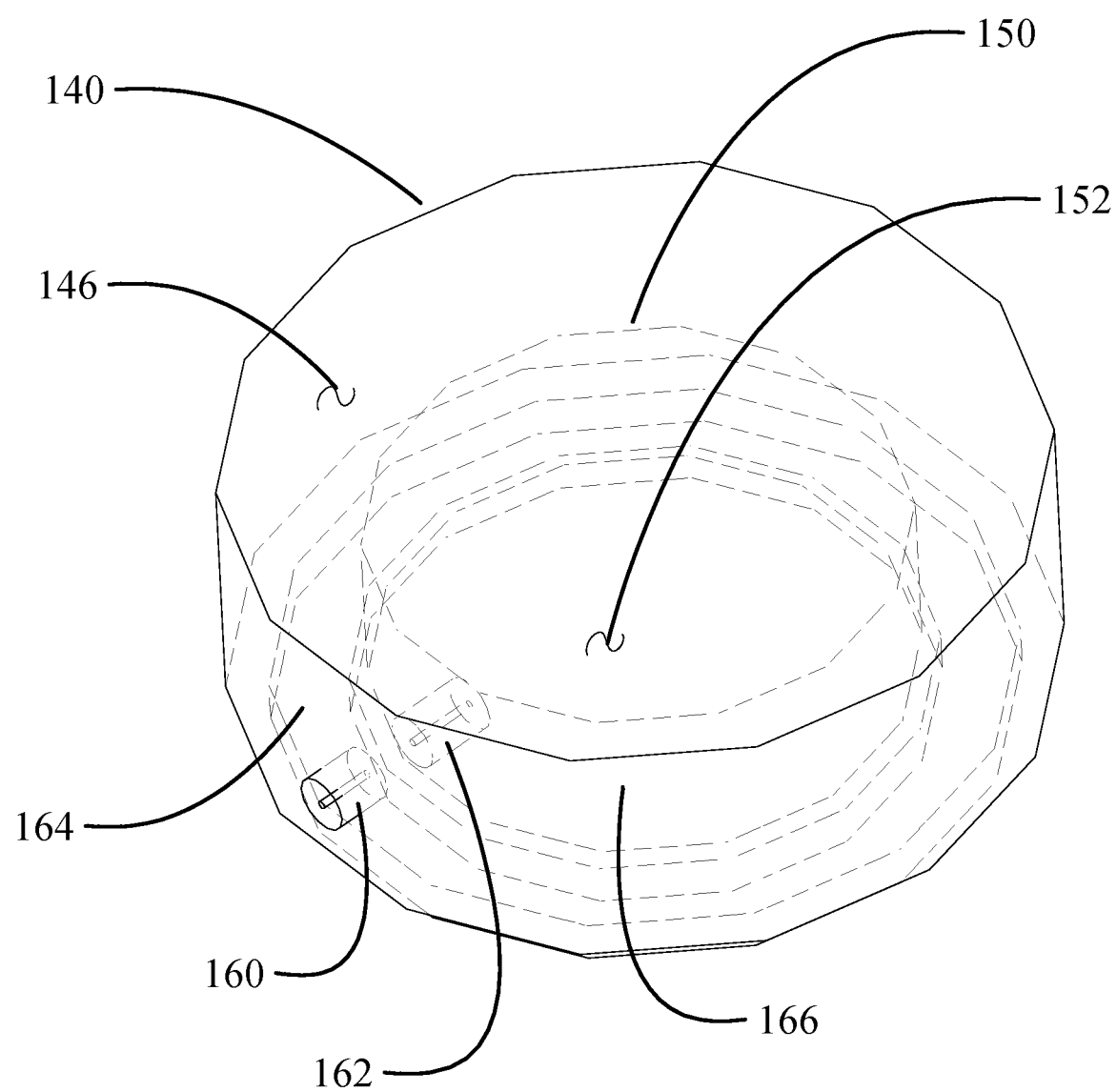
FIG. 20 is a perspective hidden line representation of the unitary cell with pressure valves in the side walls of the envelope and inner element.
Figure 21:
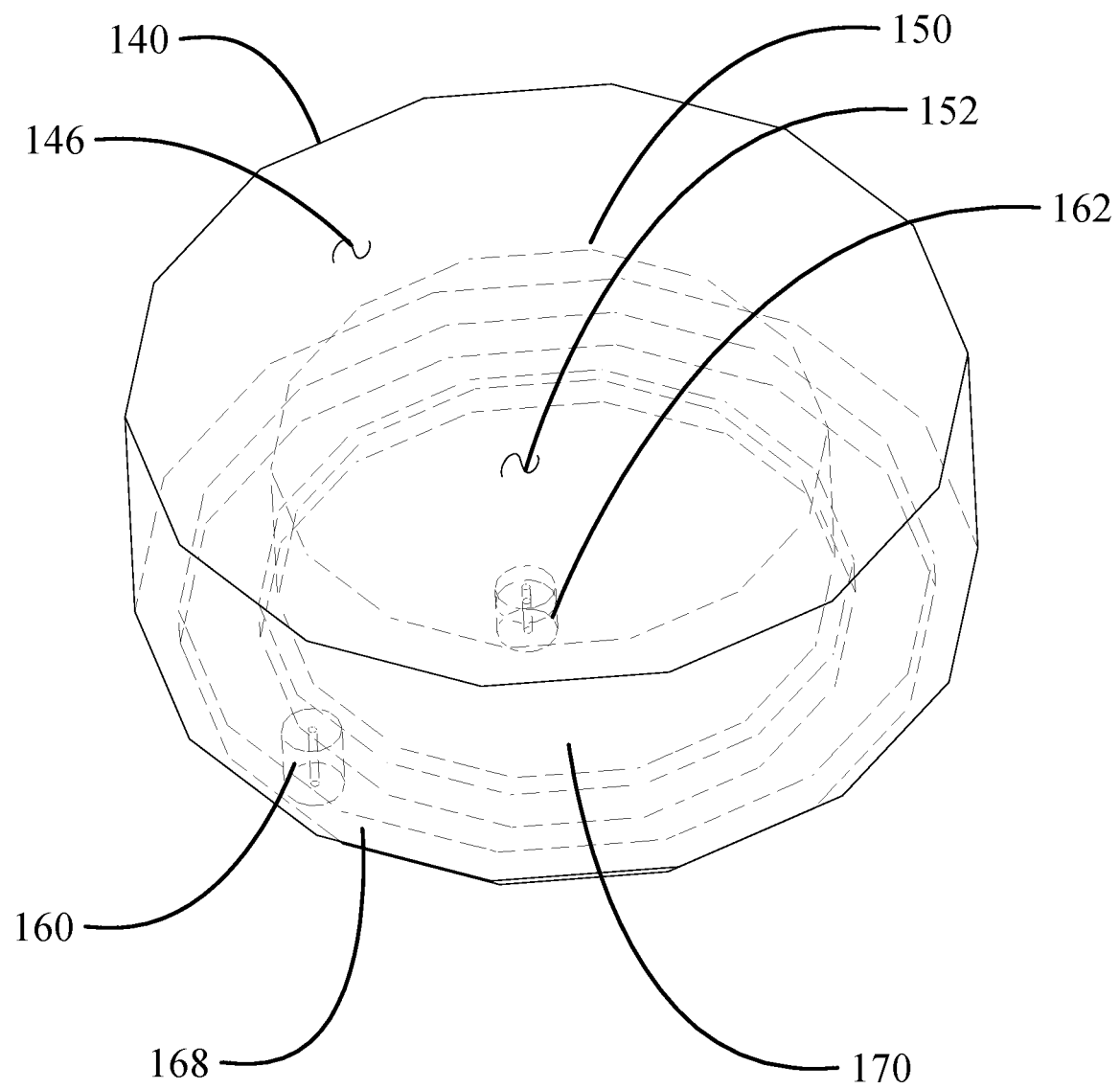
FIG. 21 is a perspective hidden line representation of the unitary cell with pressure valves in the bottom walls of the envelope and inner element; and, FIG. 22 is a lower perspective representation of the unitary cell of FIG. 21.
Figure 22:
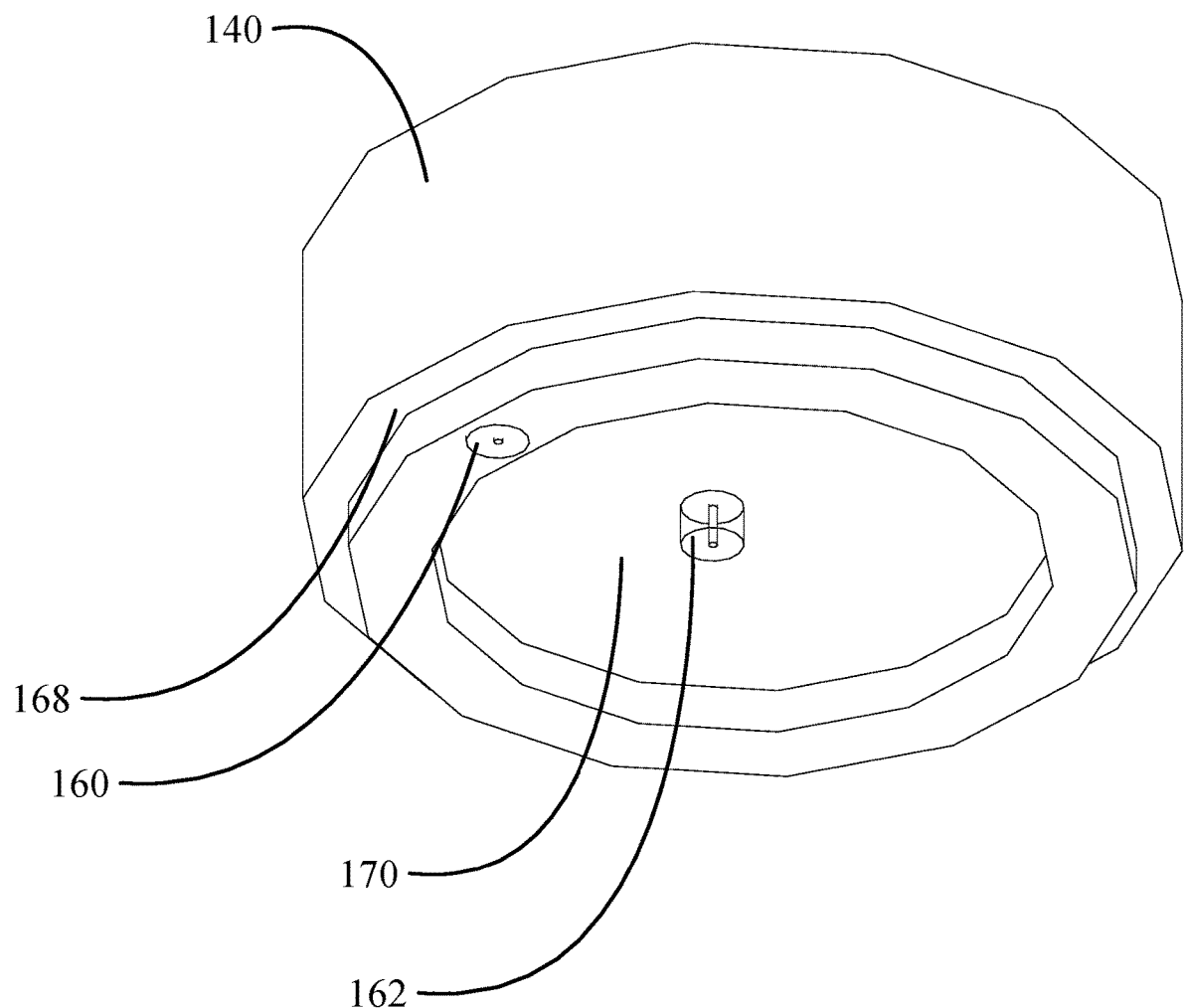

The pressure of the first working fluid and second working fluid is fixed in certain implementations and the envelope 140 and inner element 150 are sealed. In alternative implementations pressurization valves in one or both of the envelope 140 and inner element 150 are employed for pressurizing or depressurizing the working fluids. As shown in FIGS. 20 and 21 envelope needle valve 160 and inner element needle valve 162 are employed for this purpose. In FIG. 20, envelope needle valve 160 and inner element needle valve 162 are supported in envelope side wall 164 and inner element side wall 166, respectively. Envelope needle valve 160 and inner element needle valve 162 are aligned allowing insertion of a single pressure needle to be used for serial pressure modification of both the envelope 140 and inner element 150 by partially inserting the pressure needle through envelope needle valve 160 into the chamber 146 for pressure modification of the envelope and first working fluid and fully inserting the pressure needle through inner element needle valve 162 for pressure modification of the inner element and second working fluid. Alternative implementations employ support of the envelope needle valve 160 and inner element needle valve 162 are supported in envelope bottom wall 168 and inner element bottom wall 170, respectively, as shown in FIGS. 21 and 22. Any of the previously described structural implementations of the envelopes and filaments or pillars may be employed with any of the implementations of FIGS. 20-22.

Similarly, pressure relief vents are employed in certain implementations to provide modification of the impulse energy dissipation. The needle valves 140 and 142 are replaced with or operable as pressure relief vents for one or both the envelope 140 and inner element 150.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A shock absorbing system for impact energy dissipation comprising:
    an envelope having a chamber containing a first working fluid, said envelope removably attached to a surface and the envelope deformable in response to an impulse resulting from an impact force to attenuate the amplitude of the impulse at the surface; and,
    a plurality of resilient supplemental absorber elements comprising at least one of arcuate filaments and resilient pillars dispersed within the chamber, said plurality of resilient supplemental absorber elements deformable in response to the impulse to assist in absorbing impulse energy and provide additional resilient restoring force to return the envelope to a pre-impulse shape after the impulse.

2. The shock absorbing system as defined in claim 1 wherein the plurality of resilient supplemental absorber elements comprises arcuate filaments.

3. The shock absorbing system as defined in claim 1 wherein the plurality of resilient supplemental absorber elements comprises a combination of arcuate filaments and resilient pillars.

4. The shock absorbing system as defined in claim 1 wherein the envelope is selected from the set of rubber, elastomers and thermoplastics.

5. A unitary cell for impact energy dissipation comprising:
    an envelope having a chamber containing a first working fluid, said envelope removably attached to a surface; and
    an inner element contained within the chamber and having an inner chamber containing a second working fluid, the first working fluid having a first initial pressure and second working fluid having a second initial pressure, the first initial pressure and the second initial pressure having a pressure differential adapted to provide an altered energy absorption profile of an impulse resulting from an impact force to attenuate the amplitude if the impulse at the surface.

6. The unitary cell as defined in claim 5 wherein an initial pressure differential between the first initial pressure and the second initial pressure is between 5 psi and 300 psi.

7. The unitary cell as defined in claim 5 wherein a bottom surface of the inner chamber is mounted to a bottom surface of the envelope.

8. The unitary cell as defined in claim 5 wherein the inner chamber in the inner element has a volume of 20% to 80% of the chamber volume.

9. The unitary cell as defined in claim 5 wherein the second initial pressure is higher than the first initial pressure and wherein creation by an impact force of a pressure in the first working fluid greater than the second initial pressure of the second working fluid, results in compression of the inner element to further absorb the impulse energy providing the altered energy absorption profile based on the higher initial pressure of the second working fluid.

10. The unitary cell as defined in claim 5 wherein creation by an impact force of deformation of the envelope into contact with the inner element, the inner element also deforms providing an altered energy absorption profile based on the second initial pressure of the second working fluid.

11. The unitary cell as defined in claim 5 further comprising a plurality of resilient supplemental absorber elements comprising at least one of arcuate filaments and resilient pillars dispersed within the chamber, said plurality of resilient supplemental absorber elements deformable during all or a portion of deformation of the envelope in response to an impulse to assist in attenuating force and provide additional resilient restoring force during at least a portion of a resilient expansion of the envelope to return the envelope to a pre-impulse shape after the impulse.

12. The unitary cell as defined in claim 11 wherein the plurality of resilient supplemental absorber elements comprises arcuate filaments.

13. The unitary cell as defined in claim 11 wherein the plurality of resilient supplemental absorber elements comprises a combination of arcuate filaments and resilient pillars.

14. The unitary cell as defined in claim 5 further comprising a pressurization valve in one or both of the envelope and inner element for pressurizing or depressurizing the first or second working fluid.

15. The unitary cell as defined in claim 5 further comprising a reservoir in fluid communication with the chamber in the envelope.

16. The unitary cell as defined in claim 5 further comprising a reservoir in fluid communication with the inner chamber in the inner element.

17. The unitary cell as defined in claim 5 further comprising a relief vent in one or both of the envelope and inner element for depressurizing the first or second working fluid.

18. A unitary cell for impact energy dissipation comprising:
    an envelope having a chamber containing a first working fluid said envelope removably attached to a surface;
    an inner element contained within the chamber and having an inner chamber containing a second working fluid, the first working fluid and second working fluid having a pressure differential; and,
    a plurality of resilient supplemental absorber elements dispersed within the inner chamber, said plurality of resilient supplemental absorber elements deformable during all or a portion of deformation of the envelope in response to an impulse resulting from an impact force to assist in amplitude attenuation of the impulse over a length of compression and provide additional resilient restoring force over the length of compression to at least partially return the inner element to a pre-impulse shape after the impulse.

19. The unitary cell as defined in claim 18 wherein the plurality of resilient supplemental absorber elements comprises arcuate filaments.

20. The unitary cell as defined in claim 18 wherein the plurality of resilient supplemental absorber elements comprises resilient pillars.

\* \* \* \* \*